(12) United States Patent
Tamaki et al.

(10) Patent No.: US 7,288,868 B2
(45) Date of Patent: Oct. 30, 2007

(54) MOTOR GENERATOR

(75) Inventors: Satoshi Tamaki, Hirakata (JP);
Yasuhiro Kondo, Hirakata (JP);
Toshikazu Nagaki, Hirakata (JP);
Hideki Nakata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 253 days.

(21) Appl. No.: 10/926,145

(22) Filed: Aug. 26, 2004

(65) Prior Publication Data

US 2005/0046304 A1 Mar. 3, 2005

(30) Foreign Application Priority Data

Aug. 27, 2003 (JP) .............................. 2003-303068

(51) Int. Cl.
*H02K 1/06* (2006.01)
(52) U.S. Cl. ................. 310/254; 310/156.53; 310/184; 310/185; 310/113
(58) Field of Classification Search ................ 310/254, 310/156.53, 179, 180, 113, 134, 190, 191, 310/72, 183, 184, 185
See application file for complete search history.

(56) References Cited

U.S. PATENT DOCUMENTS

| | | | | |
|---|---|---|---|---|
| 1,545,175 | A | * 7/1925 | Turbayne | .................... 323/203 |
| 3,183,386 | A | * 5/1965 | Miller | ......................... 310/149 |
| 4,138,629 | A | * 2/1979 | Miller et al. | ................ 318/140 |
| 4,447,737 | A | 5/1984 | Cronin | |
| 4,550,267 | A | 10/1985 | Vaidya | |
| 4,761,576 | A | * 8/1988 | Savage | ......................... 310/51 |
| 4,806,812 | A | 2/1989 | Masterman | |
| 5,006,745 | A | * 4/1991 | Nishio et al. | ............... 310/177 |
| 5,036,237 | A | * 7/1991 | London | ..................... 310/172 |

(Continued)

FOREIGN PATENT DOCUMENTS

| | | |
|---|---|---|
| EP | 1508955 | 2/2005 |
| GB | 2045983 | 11/1980 |
| JP | 6-105512 | 4/1994 |
| JP | 7-264822 | 10/1995 |
| WO | PCT JP03/084034 | 10/2003 |
| WO | 03/100949 | 12/2003 |
| WO | PCT JP03/100949 | 12/2003 |

OTHER PUBLICATIONS

English language Abstract of JP 7-264822.

(Continued)

*Primary Examiner*—Burton Mullins
(74) *Attorney, Agent, or Firm*—Greenblum & Bernstein, P.L.C.

(57) ABSTRACT

A motor generator is provided with a stator having a winding around each of a plurality of stator teeth, and a rotor having a plurality of permanent magnets by the number larger than that of the stator teeth, arranged in the circumferential direction at equal intervals. The stator teeth are formed of a first stator teeth section including a plurality of stator teeth groups I, II, and III each including the adjacent stator teeth around which a winding to which the same phase voltage is applied is wound and in which winding directions of the stator teeth are opposite to each other, and a second stator teeth section including a stator teeth having a winding wound therearound and being placed among stator teeth groups of different phases such that electric power is independently input and output with respect to the first and second winding sections. This makes it possible to reduce the space and the cost while inputting/outputting the electric power through different channels and allowing arbitrary design of the electric power distribution.

24 Claims, 20 Drawing Sheets

U.S. PATENT DOCUMENTS

| | | | |
|---|---|---|---|
| 5,151,641 A | 9/1992 | Shamoto | |
| 5,164,622 A | 11/1992 | Kordik | |
| 5,294,857 A * | 3/1994 | Auinger et al. | 310/269 |
| 5,334,894 A * | 8/1994 | Nakagawa | 310/49 R |
| 5,714,823 A * | 2/1998 | Shervington et al. | 310/184 |
| 5,804,904 A * | 9/1998 | Park et al. | 310/261 |
| 6,844,648 B2 * | 1/2005 | Luttrell et al. | 310/184 |
| 2002/0047429 A1 * | 4/2002 | Kadoya et al. | 310/156.39 |
| 2003/0122445 A1 * | 7/2003 | Takano | 310/254 |
| 2004/0104637 A1 * | 6/2004 | Dube et al. | 310/177 |
| 2004/0239202 A1 * | 12/2004 | Dooley | 310/184 |
| 2005/0029890 A1 | 2/2005 | Kadoya et al. | |

OTHER PUBLICATIONS

Ertugrub et al., "Investigation of a fault tolerant and high performance motor drive for critical applications," Institute of Electrical and Electronics Engineers, Telecon 2001, Proceedings of IEEE Region 10 International Conference on Electrical and ElectronIC Technology, IEEE Region 10 Annual Conference, vol. vol. 1 of 2, pp. 542-548 (2001).

Zhu et al., "Influence of Design Parameters on Cogging Torque in Permanent Magnet Machines," IEEE Transactions on Energy Conversion, vol. 15, No. 4, pp. 407-412 (2000).

English Language Abstract of JP 6-105512.

U.S. Appl. No. 10/488,534, filed Mar. 4, 2004.

U.S. Appl. No. 10/487,943, filed Mar. 4, 2004.

English Language Abstract of JP 6-105512, Apr. 15, 1994.

* cited by examiner

Same Group(Same Phase Stator Teeth)

$\theta mg = 360/P$
$360/P < \theta s \leq 360/T$
(≠)

MOTOR GENERATOR

The present disclosure relates to subject matter contained in priority Japanese Patent Application No. 2003-303068, filed on Aug. 27, 2003, the contents of which is herein expressly incorporated by reference in its entirety.

BACKGROUND OF THE INVENTION

1. Field of the Invention

The present invention relates to a motor generator, and more particularly, to a motor generator that can be applied to an electric vehicle such as a pure electric vehicle (PEV), a hybrid electric vehicle (HEV) and a fuel cell electric vehicle (FCEV), a high power aerogenerator, and a generator for an internal combustion engine.

2. Description of the Related Art

A hybrid electric vehicle provided with a drive system including an internal combustion engine and an electric motor has two types of batteries, that is, a high voltage battery for driving the electric motor and a low voltage battery for driving an accessory of the vehicle such as a lamp unit and audio equipment. The high voltage battery is configured to be charged by a motor generator mounted in the vehicle.

FIG. 28 represents the configuration of a conventional hybrid electric vehicle. The hybrid electric vehicle is configured to transmit power output from an internal combustion engine 101 and/or an electric motor 102 to wheels via a drive train 103. The electric motor 102 is driven and controlled with power from a high voltage battery 104 via a power converter 105. An alternator 106 generates electric power in conjunction with the operation of the internal combustion engine 101 so as to charge the low voltage battery 107. Upon charging of the high voltage battery 104, the electric motor 102 is activated to serve as the generator and charges the high voltage battery 104 via the power converter 105.

There is also a known hybrid electric vehicle having the low voltage battery 107, which is charged by the high voltage battery 104 via a DC-DC converter instead of using the alternator 106.

Various kinds of motor generators of field winding type have been proposed. For example, Japanese Patent Laid-Open Publication No. 6-105512 discloses the motor generator having two windings, one connected to the high voltage battery, and the other connected to the low voltage battery.

The drive system for the known electric vehicle requires motor generators for the high-voltage system for the drive system and for the low voltage system for accessories, respectively, or requires a single motor generator and the DC-DC converter. This may cause increase not only in space to accommodate those units but also in cost.

In the case where the motor generator of the field winding type having two windings is employed, and one of those windings is wound for driving the vehicle, the size of the motor generator becomes so large that it cannot be mounted on the vehicle. Additionally, it is difficult to control the aforementioned windings simultaneously because of the field winding type.

SUMMARY OF THE INVENTION

In view of the aforementioned problems, it is an object of the present invention to provide a motor generator formed by combining a plurality of types of the motor generator of field winding type using permanent magnets such that a plurality of electric powers can be input to or output from different sources independently at a reduced cost while reducing the installation space, and the distribution of the electric power can be arbitrarily designed.

In order to achieve the aforementioned object, a motor generator according to an aspect of the invention comprises a stator in which a winding is wound around each of a plurality of stator teeth provided on a stator core, and a rotor having a plurality of permanent magnets by the number larger than that of the stator teeth, arranged on a rotor core circumferentially at equal intervals. The stator teeth are formed of a first stator teeth section having a plurality of groups of adjacent stator teeth around which a winding to which the same phase voltage is applied is wound and in which winding directions of the windings around the adjacent stator teeth are opposite to each other, and a second stator teeth section formed of at least one stator teeth positioned between the stator teeth groups of the first stator teeth section each having a different phase. If the second stator teeth section has a plurality of stator teeth, winding directions of the adjacent stator teeth are opposite to each other. As a result, electric power is independently input and output with respect to each of the windings of the first and second stator teeth sections.

According to the above aspect of the invention, the motor generator has a simple structure of magnetic field type using the permanent magnets, and formed by providing windings around the respective stator teeth by the number smaller than that of the permanent magnets. This makes it possible to reduce the space and cost. The stator teeth are formed of the first stator teeth section and the second stator teeth section such that a plurality of electric powers may be input/output with respect to the respective windings of the first and second stator teeth sections independently. Further the respective numbers of the stator teeth of the first and second stator teeth sections are arbitrarily selected, resulting in freedom in designing distribution of the electric power to be input/output.

A motor generator according to another aspect of the invention comprises a stator in which a winding is wound around each of a plurality of stator teeth provided on a stator core, and a rotor having a plurality of permanent magnets by the number larger than that of the stator teeth, arranged on a rotor core circumferentially at equal intervals. The stator teeth are divided into a plurality of groups each having adjacent stator teeth around which a winding to which the same phase voltage is applied is wound and in which winding directions of the adjacent stator teeth are opposite to each other. The stator teeth of each group are further divided into a plurality of secondary stator teeth sections such that electric power is independently input and output with respect to each of the windings of the respective secondary stator teeth sections.

According to the above aspect of the invention, the motor generator has a simple structure of magnetic field type using the permanent magnets, and formed by providing windings on the respective stator teeth by the number smaller than that of the permanent magnets. This makes it possible to reduce the space and cost. Electric power may be input/output with respect to each of the windings of the respective secondary stator teeth sections in the plurality of stator teeth groups, independently. The invention allows the secondary stator teeth section to be arbitrarily determined, resulting in freedom in designing distribution of the electric power.

A motor generator according to yet another aspect of the invention comprises a stator in which a winding is wound around each of a plurality of stator teeth provided on a stator core, and a rotor having a plurality of permanent magnets by the number larger than that of the stator teeth, arranged on a rotor core circumferentially at equal intervals. The stator teeth are formed of a first stator teeth section having a plurality of groups of adjacent stator teeth around which a winding to which the same phase voltage is applied is wound and in which winding directions of the adjacent stator teeth are opposite to each other, and a second stator teeth section formed of at least one stator teeth positioned between the stator teeth groups of the first stator teeth section each having a different phase. If the second stator teeth section has a plurality of stator teeth, winding directions of the adjacent stator teeth are opposite to each other. The stator teeth of at least one of the stator teeth groups of the first stator teeth section and the second stator teeth section are divided into a plurality of secondary stator teeth sections such that electric power is independently input/output with respect to each of the windings of the first and second stator teeth sections or each of the windings of the secondary stator teeth sections when they are divided into the secondary stator teeth sections.

As the motor generator is formed by combining the aforementioned two aspects of the invention, electric power may be input/output via three or more channels in addition to the effects as described above, which allows the distribution of electric power to be arbitrarily designed.

A motor generator according to still another aspect of the invention comprises a stator in which a winding is wound around each of a plurality of stator teeth provided on a stator core, and a rotor having a plurality of permanent magnets by the number larger than that of the stator teeth arranged on a rotor core circumferentially at equal intervals. The stator teeth are divided into a plurality of groups of the stator teeth around which a winding to which the same phase voltage is applied is wound and in which winding directions of the adjacent stator teeth are opposite to each other to constitute a plurality of units. The plurality of units are stacked in an axial direction, and each thickness of the units or each diameter thereof is changed such that electric power is independently input and output with respect to each of the windings of the respective units.

The motor generator according to this aspect of the invention has a simple structure of magnetic field type using the permanent magnets, and formed by providing windings on the respective stator teeth by the number smaller than that of the permanent magnets. This makes it possible to reduce the space and cost. The thickness or diameter of the unit may be changed so as to input/output electric power through a plurality of channels while arbitrarily designing distribution of the electric power.

The rotor of the above structured motor generator may be formed by placing the permanent magnets on the surface of the rotor core, or formed by embedding the permanent magnets in the rotor core so as to obtain the reluctance torque. The motor generator may be of inner rotor type in which the rotor is rotationally disposed inside of the stator, or outer rotor type in which the rotor is rotationally disposed on the outer periphery of the stator.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 7A and 7B show a second embodiment of the invention, wherein FIG. 7A is a perspective view of an essential portion, and FIG. 7B is a plan view of a rotor of reluctance type;

FIGS. 17A and 17B show a modified example according to the sixth embodiment of the invention, wherein FIG. 17A shows an essential portion of the configuration, and FIG. 17B shows a view seen from arrow XVIIB in FIG. 17A;

FIGS. 18A and 18B show another modified example of the sixth embodiment of the invention, wherein FIG. 18A shows an essential portion of the configuration, and FIG. 18A shows a view seen from arrow XVIIIB in FIG. 18A;

FIGS. 25A and 25B show an eleventh embodiment of the invention, wherein FIG. 25A is a sectional view of the configuration in an axial direction, and FIG. 25B schematically show a sectional view of the configuration according to a modified example in the axial direction;

DETAILED DESCRIPTION OF THE PREFERRED EMBODIMENTS

Respective embodiments of a motor generator according to the present invention will be hereinafter described with reference to FIGS. 1 to 27.

First Embodiment

Figure 1:
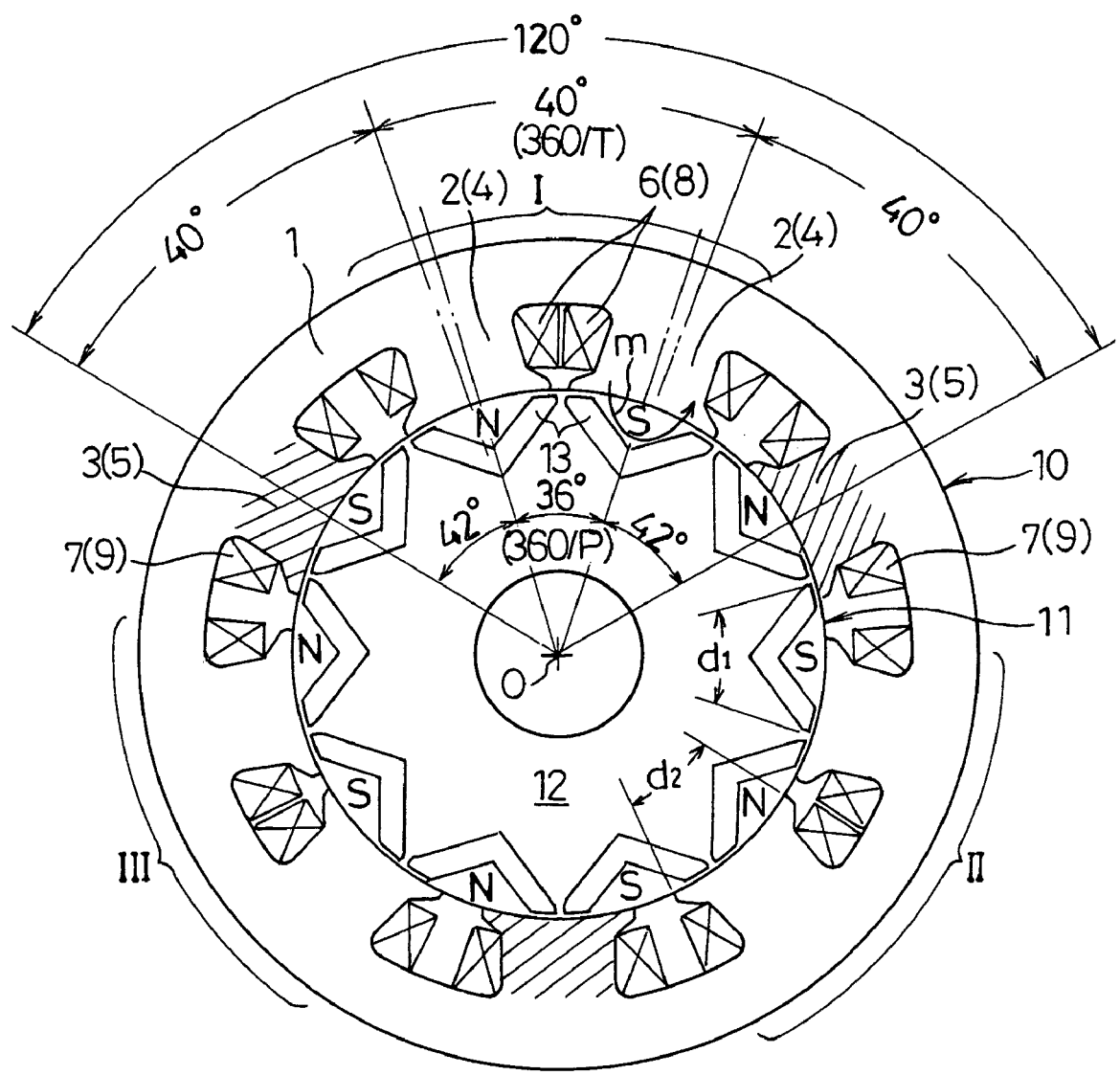
FIG. 1 is a sectional view schematically showing the configuration of a first embodiment of the invention.
Figure 2:
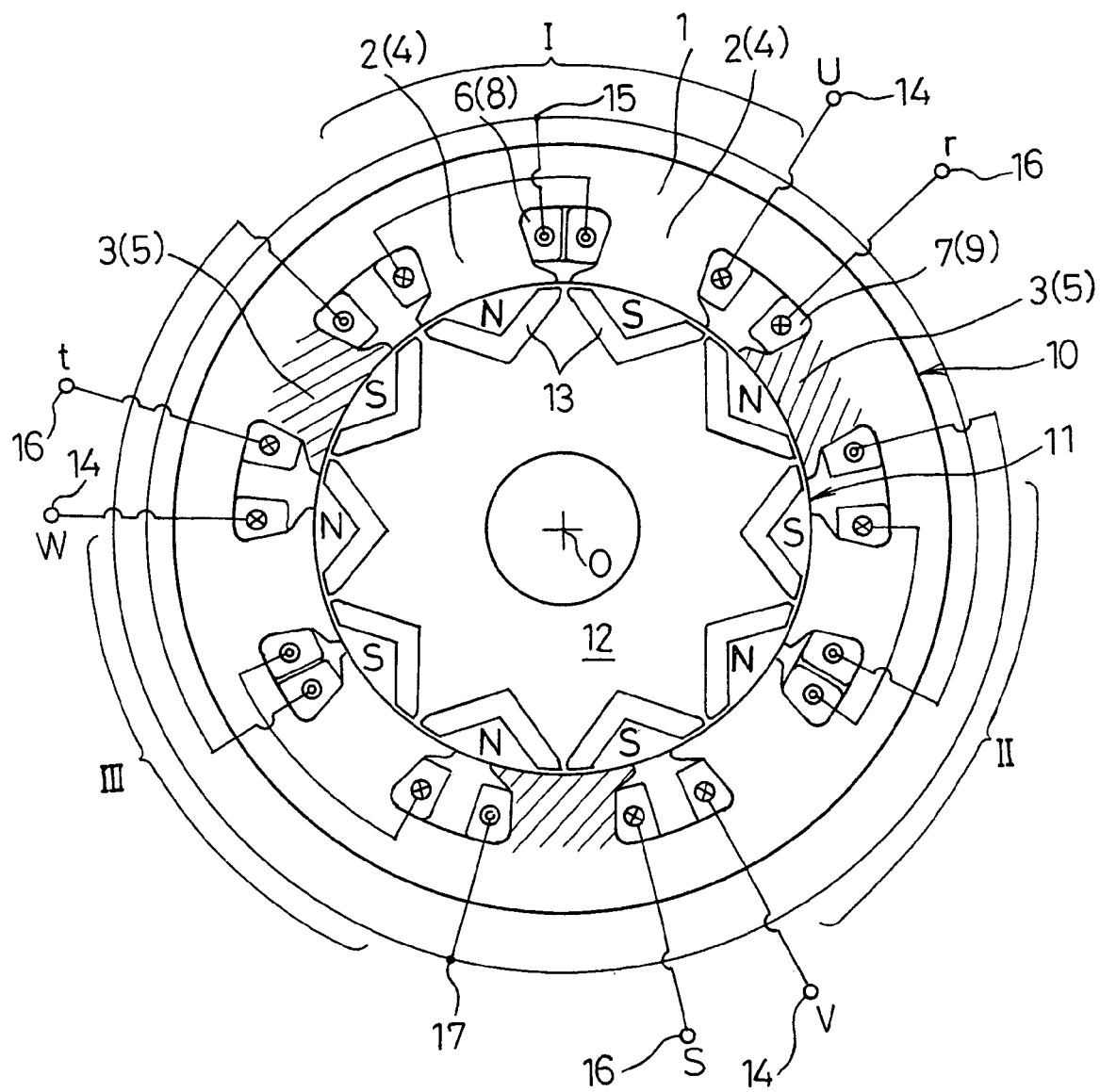
FIG. 2 is a connecting diagram representing connection of a winding according to the first embodiment of the invention.

A first embodiment of the motor generator according to the invention will be described with reference to FIGS. 1 to 6. FIG. 1 is a vertical sectional view of the motor generator of the invention with respect to the rotating axis. FIG. 2 is a connecting diagram of the winding. Referring to FIG. 1, a stator core 1 formed by stacking electromagnetic steel plates is provided with a plurality of stator teeth 2 that constitute a first stator teeth section 4, and a plurality of stator teeth 3 (shaded to be distinguished from the stator teeth 2) that constitute a second stator teeth section 5. A winding 6 that constitutes a first winding section 8 is wound around the stator teeth 2, and a winding 7 that constitutes a second winding section 9 is wound around the stator teeth 3 so as to form a stator 10.

Meanwhile a rotor 11 is formed by embedding a plurality (even number) of permanent magnets 13 at uniform intervals in the rotor core 12 formed as the stacked electromagnetic plates. The rotor 11 is provided so as to rotate around the center O of the rotation, leaving a small gap with respect to the stator teeth 2, 3 of the stator 10. The permanent magnets 13 are arranged such that each of adjacent permanent magnets is directed toward different direction of the magnetic field. The permanent magnets 13 may be embedded in the rotor core 12 or placed on the surface thereof. In the case where the permanent magnets 13 are embedded as shown in the drawing, a portion of the rotor 11 that faces the stator 10 is divided into two areas, that is, the area at a low magnetic resistance where the flux is likely to pass relatively easily as shown by arrow m in FIG. 1, and the area at a high magnetic resistance where the magnetic flux is unlikely to pass. This may cause the difference between the inductance in the direction of q axis and inductance in the direction of d axis, thus generating a reluctance torque. The generated torque, thus, will be increased to a high value.

As shown in FIGS. 1 and 2, the first stator teeth section 4 where the winding 6 of the first winding section 8 is wound includes six stator teeth 2 in total. As shown in FIG. 2, there are three stator teeth groups obtained by dividing the first stator teeth section 4, that is, a stator teeth group I in which voltage at phase U is applied to the winding 6 wound around the stator teeth 2, a stator teeth group II in which the voltage at phase V is applied, and a stator teeth group III in which the voltage at phase W is applied. Each of the aforementioned stator teeth groups is provided with two stator teeth. The stator teeth groups I, II, and III are arranged at a phase difference of 120° as an electrical angle. The first winding section 8 constitutes a three-phase winding formed of U phase, V phase, and W phase. The windings 6 of the adjacent stator teeth 2 are directed to be opposite to each other such that the polarity of one stator teeth 2 is reversed against that of the other stator teeth 2. This makes it possible to correct the bias in the magnetic field, thus reducing distortion in the waveform at a counter voltage generated between terminals of the winding upon drive of the motor. As a result, the iron loss is reduced. In this embodiment, the windings 6 wound around the respective two stator teeth 2 are connected in series. However, they may be connected in parallel. In the drawing, the three-phase winding is star wired, but may be delta wired. There are terminals 14 of the winding 6 for each phase of the first winding section 8, and a terminal 15 as a neutral contact point of the winding 6 of the respective phases.

There is one stator teeth 3 of the second stator teeth section 5 having the winding 7 of the second winding section 9 is disposed in each space among the stator teeth groups I, II, and III. The voltages at r phase, s phase, and t phase are applied to the corresponding stator teeth 3, respectively. There is a terminal 16 of the winding 7 at each phase of the winding section 9, and a neutral contact point 17 of the winding 7 at each phase. As shown in the drawing, one stator teeth 3 is disposed in each space among the stator teeth groups I, II, and III of the second winding section 9. If a plurality of the stator teeth 3 are provided, the winding directions of the respective windings 7 of the adjacent stator teeth 3 are made opposite to each other, and each polarity of the adjacent poles 3 is inversed with each other.

In the first stator teeth section 4 of this embodiment, the stator teeth groups I, II, and III each have two stator teeth 2, that is, the first stator teeth section 4 has two pairs. The first stator teeth section 4 includes a group of windings at U phase, V phase and W phase, and accordingly is formed of six stator teeth 2. The second stator teeth section 5 has three stator teeth 3, each of which is disposed in each space among the salient groups I, II and III, that is, the second stator teeth group 5 has one pair. The second stator teeth section 5 includes a group of the windings at r phase, s phase, and t phase, and accordingly is formed of three stator teeth 3. The stator 10 includes nine stator teeth in total, that is, six stator teeth 2 of the first stator teeth section 4, and three stator teeth 3 of the second stator teeth section 5.

Assuming that the number of the stator teeth 2 of the first stator teeth section 4 is t1, the number of the stator teeth 3 of the second stator teeth section 5 is t2, the total number of the stator teeth is T, that is, (t1+t2), the total number of the pairs in the first stator teeth section 4 and the second stator teeth section 5 is n, and the number of winding groups is s, and k is a positive integer, then the total number T of the stator teeth is obtained by the following equation.

$$T = 3 \times s \times n \tag{1}$$

The number of poles P of the permanent magnets 13 of the rotor 11 is obtained by the following equation, and set to a value larger than the total number T of the stator teeth.

$$P=2\times(s(\pm1+3k)) \quad (2)$$

The equation (2) is established in the condition where the rotor smoothly rotates upon application of electric current at the phase U, V, and W to the first stator teeth section 8 in this order. That is, the induced voltage waveform Be of the magnet is obtained by the following equation (3):

$$Be=\sin(P/2\times\theta) \quad (3)$$

where the number of pole pairs is P/2. As the three-phase motor is employed, the U-phase, V-phase, and W-phase are shifted at the electrical angle of 120°. In the case where electric current is applied to each winding at the corresponding phase at a different electrical angle by 120°, the rotor is required to be rotated at the same angle in the same direction, that is, the following equation is required to be established.

$$\sin(P/2\times(\theta+120/s))=\sin(P/2\times\theta\pm120+360k) \quad (4)$$

Assume that when the induced voltage waveform (rotor) is at the position shifted by the electrical angle of 120° with respect to a certain time (Be=0), the position is identical to a position shifted by 120° around a stator axis (which corresponds to the difference between U, V, and W phases). In this case, the equation (4) represents that the rotor position (the induced voltage waveform Be) always gives electrically the same value even if electric current is applied to the positions at respective phases in the order of U, V, and W each shifted by 120°, resulting in a smooth single rotation. The number of the pole pairs P/2 is derived from the equation (4) and resulting in the following equation (5):

$$P/2=s(\pm1+3k) \quad (5)$$

As a result, the number of poles P becomes a function of the number of winding groups s as represented by the above-described equation (2).

Example of the combination of the above-obtained number of poles P and the total number of stator teeth T will be obtained as shown in the following table 1.

TABLE 1

| Number of Winding Groups (s) | Number of Pairs (n) | Number of Poles (P) | Number of Slots (T) |
| --- | --- | --- | --- |
| 1 | 1 | 3 | 10 | 9 |
| 2 | 1 | 3 | 14 | 9 |
| 3 | 1 | 3 | 16 | 9 |
| 4 | 1 | 4 | 14 | 12 |
| 5 | 1 | 4 | 16 | 12 |
| 6 | 1 | 4 | 20 | 12 |
| 7 | 1 | 5 | 16 | 15 |
| 8 | 1 | 5 | 20 | 15 |
| 9 | 1 | 5 | 22 | 15 |
| 10 | 1 | 6 | 20 | 18 |
| 11 | 1 | 6 | 22 | 18 |
| 12 | 1 | 6 | 26 | 18 |
| 13 | 1 | 7 | 22 | 21 |
| 14 | 1 | 7 | 26 | 21 |
| 15 | 1 | 7 | 28 | 21 |
| 16 | 2 | 3 | 20 | 18 |
| 17 | 2 | 3 | 28 | 18 |
| 18 | 2 | 4 | 28 | 24 |
| 19 | 2 | 4 | 32 | 24 |
| 20 | 2 | 5 | 32 | 30 |
| 21 | 2 | 5 | 40 | 30 |
| 22 | 2 | 6 | 40 | 36 |
| 23 | 3 | 3 | 30 | 27 |

TABLE 1-continued

| Number of Winding Groups (s) | Number of Pairs (n) | Number of Poles (P) | Number of Slots (T) |
| --- | --- | --- | --- |
| 24 | 3 | 3 | 42 | 27 |
| 25 | 3 | 4 | 42 | 36 |
| 26 | 4 | 3 | 40 | 36 |

Referring to Table 1, the number of poles P of the permanent magnets 13 may take various values that are larger than the value T. As shown by the shaded sections, it is preferable to use the minimum value among those larger than the value T for the purpose of obtaining the highest volumetric efficiency. In this embodiment, the total number of poles T including the stator teeth 2, 3 is set to 9. Accordingly, the number of poles P of the permanent magnets 13 is set to 10.

The embodiment is configured such that electric power is independently input/output with respect to the first stator teeth section 4 and the second stator teeth section 5. The number of the stator teeth 2 that constitute the first stator teeth section 4 and the number of the stator teeth 3 that constitute the second stator teeth section 5 may be arbitrarily selected independently, resulting in freedom in designing the distribution of electric power to be input/output. The motor generator of the embodiment is of magnetic field type using the permanent magnets 13 and has a simple structure formed by windings 6, 7 around the stator teeth 2, 3, by the number smaller than that of the permanent magnets 13, respectively. As a result, the size and the cost of the motor generator are reduced.

Referring to the example shown in FIGS. 1 and 2, the pitch between the stator teeth 2 of the first stator teeth section 4 is made equal to that of the permanent magnets 13, that is, 360/P (=36°). The stator teeth 3 of the second stator teeth section 5 are arranged at intervals of 120° such that the stator teeth 2 and 3 are positioned at an interval of 42°. If the pitch of the stator teeth 2 of the first stator teeth section 4 is made substantially equal to that of the permanent magnets 13, the phase of the stator teeth 2 coincides with that of the permanent magnet 13 without the phase shifting, resulting in high controllability. Meanwhile, each pitch of the stator teeth 2 and 3 of the first and the second stator teeth sections 4, 5 becomes uneven with respect to the circumference of the stator 10, and accordingly, the resultant cogging torque may become unequal. The pitch of the stator teeth 2 of the first stator teeth section 4 is selected between the value of 360/P (=36°) that is equal to the pitch of the permanent magnets 13 and 360/T (=40°) at which the stator teeth 2, 3 are arranged at equal intervals depending on the feature to be prioritized, that is, controllability or the cogging torque.

As the relationship P>T is established as described above, the pitch of the permanent magnets 13 is smaller than the average pitch of the stator teeth 2, 3, the relationship d1≦d2 may be set where d1 represents the effective width of the permanent magnet 13 in the circumferential direction, and d2 represents the width of each distal end of the stator teeth 2, 3 in the circumferential direction, as shown in FIG. 1. In practice, this type of setting is employed. The whole area of the permanent magnet 13 is always overlapped with the distal ends of the stator teeth 2, 3. This may form the induced voltage waveform into sinusoid, thus preventing deformation of the induced voltage waveform as well as improving the controllability of generated voltage.

Figure 3:
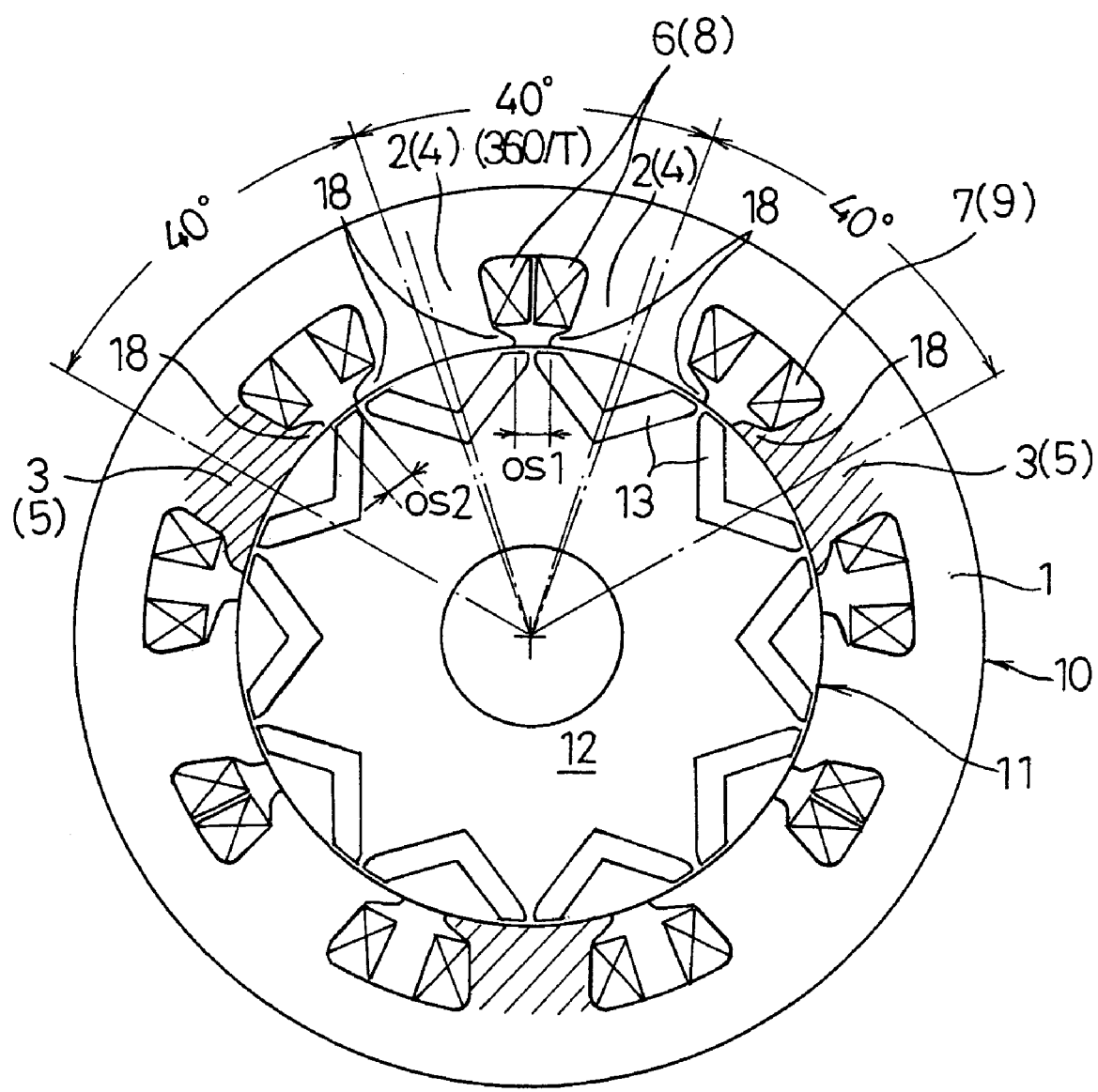
FIG. 3 is a sectional view showing a first modified example of the first embodiment of the invention.

In the case where the respective pitches of those stator teeth 2, 3 are not set to 360/T, the length of a leg 18 that extends toward both sides in the circumferential direction is adjusted at each of the distal ends of the stator teeth 2, 3 as shown in FIG. 3 such that an open slot angle os1 defined by the stator teeth 2,2 becomes equal to an open slot angle os2 defined by the stator teeth 2 and 3. Then the variation in the permeance of the magnetic path is reduced when the permanent magnet 13 passes through the open slot. This reduces the cogging torque.

Figure 4:
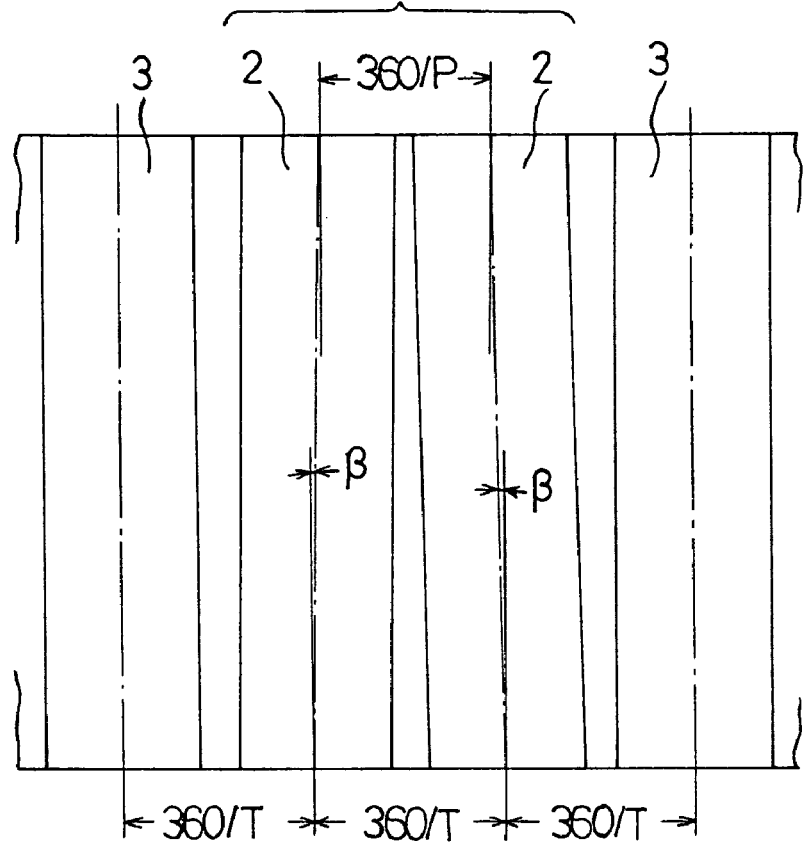
FIG. 4 is an explanatory view representing a state where a skew is formed on a stator teeth according to a second modified example of the first embodiment of the invention.

In the case where the pitch of the stator teeth 2 of the first stator teeth section 4 is not set to 360/P, a skew at an arbitrary angle between the set angle and 360/P is formed in the stator teeth 2 of the respective stator teeth groups I, II, III as shown in FIG. 4. This reduces the influence due to the phase shift between the stator teeth 2 and the permanent magnet 13. As a result, the controllability at high speeds is improved while reducing the cogging torque. In the example shown in FIG. 4, the skew at the angle of β is formed such that the pitch at one end of the stator teeth 2 is set to 360/T, and the other end of the stator teeth 2 is set to 360/P. However, the angle of the skew is selectable among the value between 0 and β.

Figure 5:
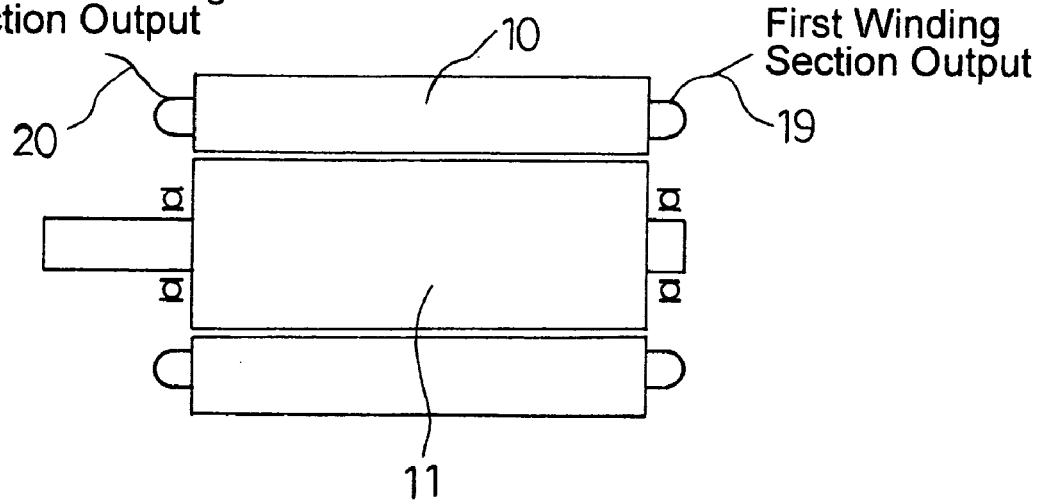
FIG. 5 is a sectional view showing a state of an output line in an axial direction according to a third modified example of the first embodiment of the invention.
Figure 6:
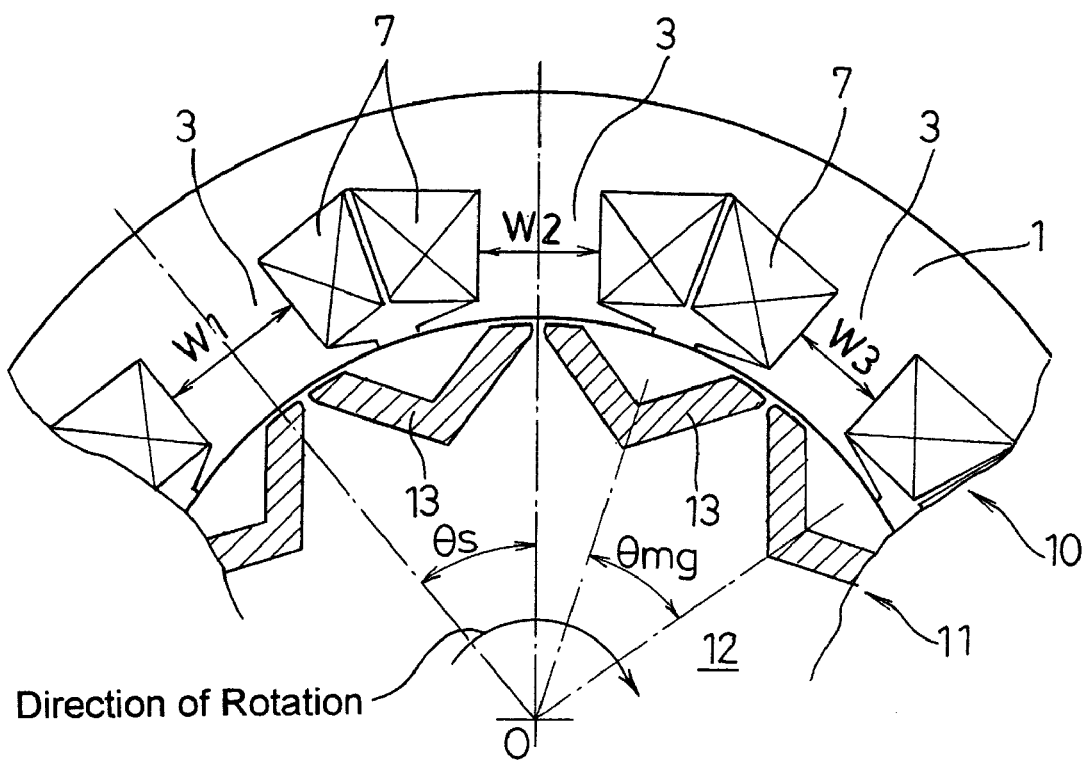
FIG. 6 is a sectional view showing an essential portion of a fourth modified example of the first embodiment of the invention.

An output line 19 of the first winding section 6 and an output line 20 of the second winding section 8 are configured such that the respective outputs are provided in opposite directions along the axis of the motor generator, as shown in FIG. 5. This makes it possible to keep the isolation between the output lines 19 and 20 easily with the compact structure.

If the pitch θs of the stator teeth 2 of the first stator teeth section 4 does not coincide with the pitch 360/P of the permanent magnet 13, which is in the range larger than 360/P and equal to or smaller than 360/T, that is, 360/P<θs≦360/T, the sectional area of wound portion of the winding 6 of each of the stator teeth 2 is adjusted. More specifically, the sectional area w2 of the stator teeth 2 positioned forward in the rotating direction of the rotor 11 is preferably adjusted to be smaller than the sectional area w1 of the stator teeth 2 positioned rearward. Furthermore, the sectional area w3 of the stator teeth 2 positioned further frontward is preferably adjusted to be smaller than the sectional area w2. This makes it possible to eliminate the difference in the flux density owing to the difference in phase between the stator teeth 2, 2, that is, to realize uniform flux density among the respective stator teeth groups I, II, and III. Accordingly, the induced voltage generated in the windings 6 of the respective stator teeth 2 becomes uniform, thus improving controllability in the generated voltage. The stator teeth 2 having its sectional area reduced allows the diameter of the winding 6 to be increased, thus reducing the copper loss by the amount corresponding to the increase in the winding diameter, and improving the efficiency.

Second Embodiment

Figure 7A:
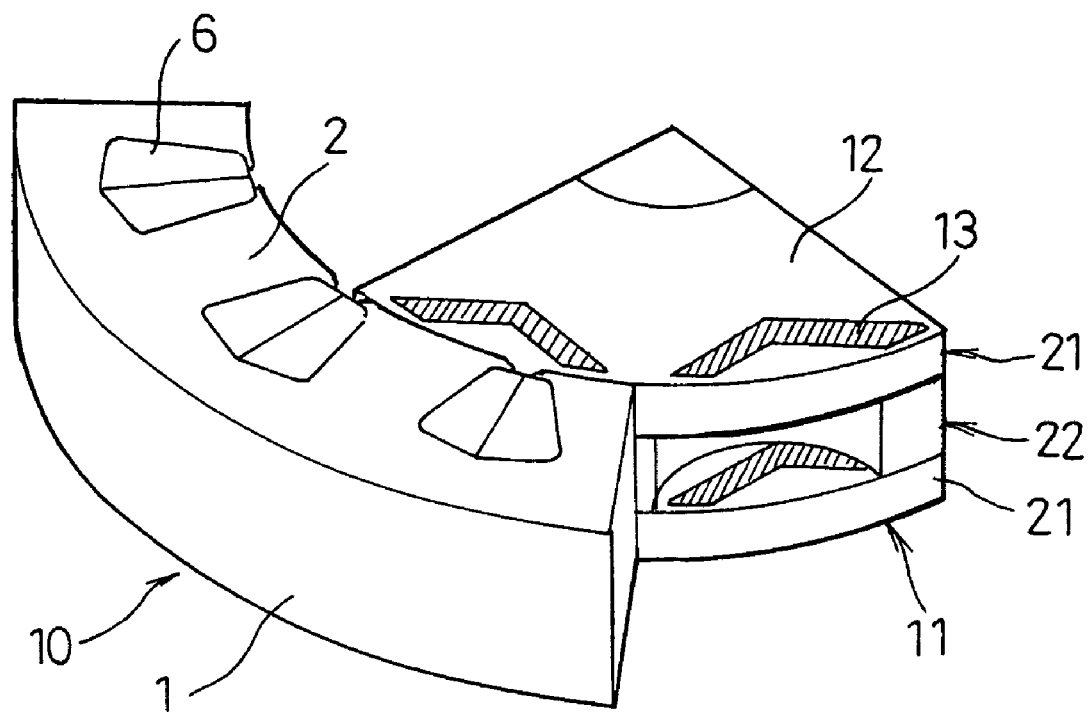
Figure 7B:
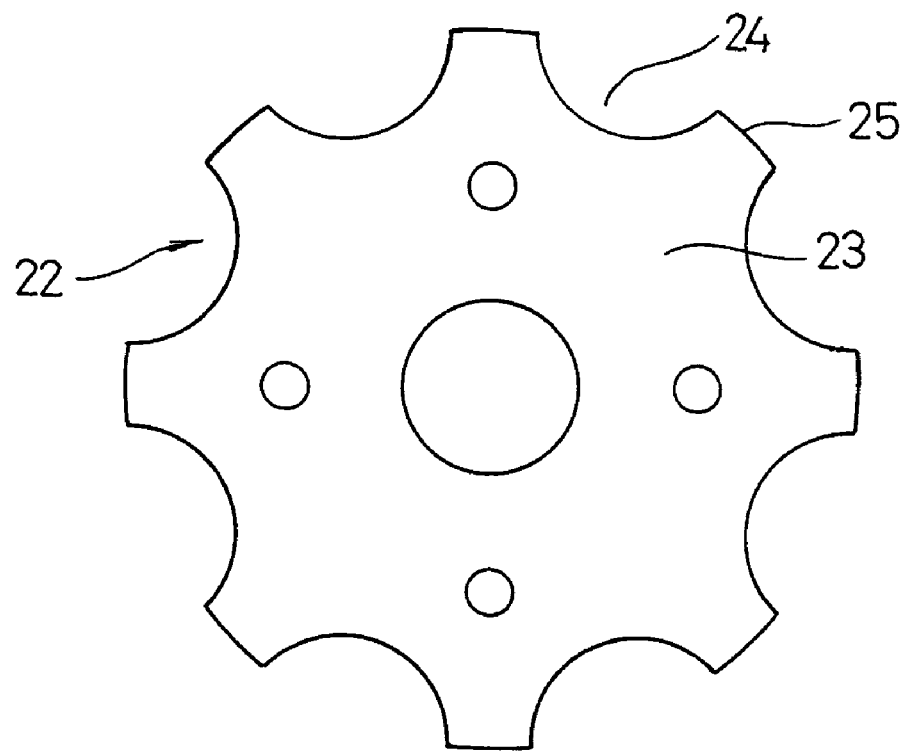

A second embodiment of the invention will be described with reference to FIGS. 7A and 7B. The structural elements identical to those described in the first embodiment will be designated by the same reference numerals, and the description thereof will be omitted and the following descriptions focus mainly on the points of difference from the preceding embodiment.

In the previous embodiment, the rotor 11 is of magnet type formed by embedding permanent magnets 13 in the rotor core 12. In this embodiment, the rotor 11 is formed by stacking magnet type rotor portions 21 and reluctance type rotor portions 22 in the axial direction as shown in FIG. 7A. The magnet type rotor portion 21 is formed by embedding the permanent magnets 13 in the rotor core 12. The reluctance type rotor portion 22, as shown in FIG. 7B, has stator teeth 25 by the number equal to that of the permanent magnets 13 by forming recess portions 24 on the outer periphery of the rotor core 23 at equal intervals.

In the above-described configuration, reluctance torque is used in more frequent cases, and accordingly, effects as described below are obtained. In the case where the pitch of the stator teeth 2 is not set to 360/P, that is, cogging torque feature is prioritized over the controllability, the controllability especially in a state of high speed rotating operation is deteriorated. The use of the reluctance torque improves the controllability so as to provide a motor generator with improved cogging torque feature while maintaining high controllability at the high speed rotating operation.

Third Embodiment

Figure 8:
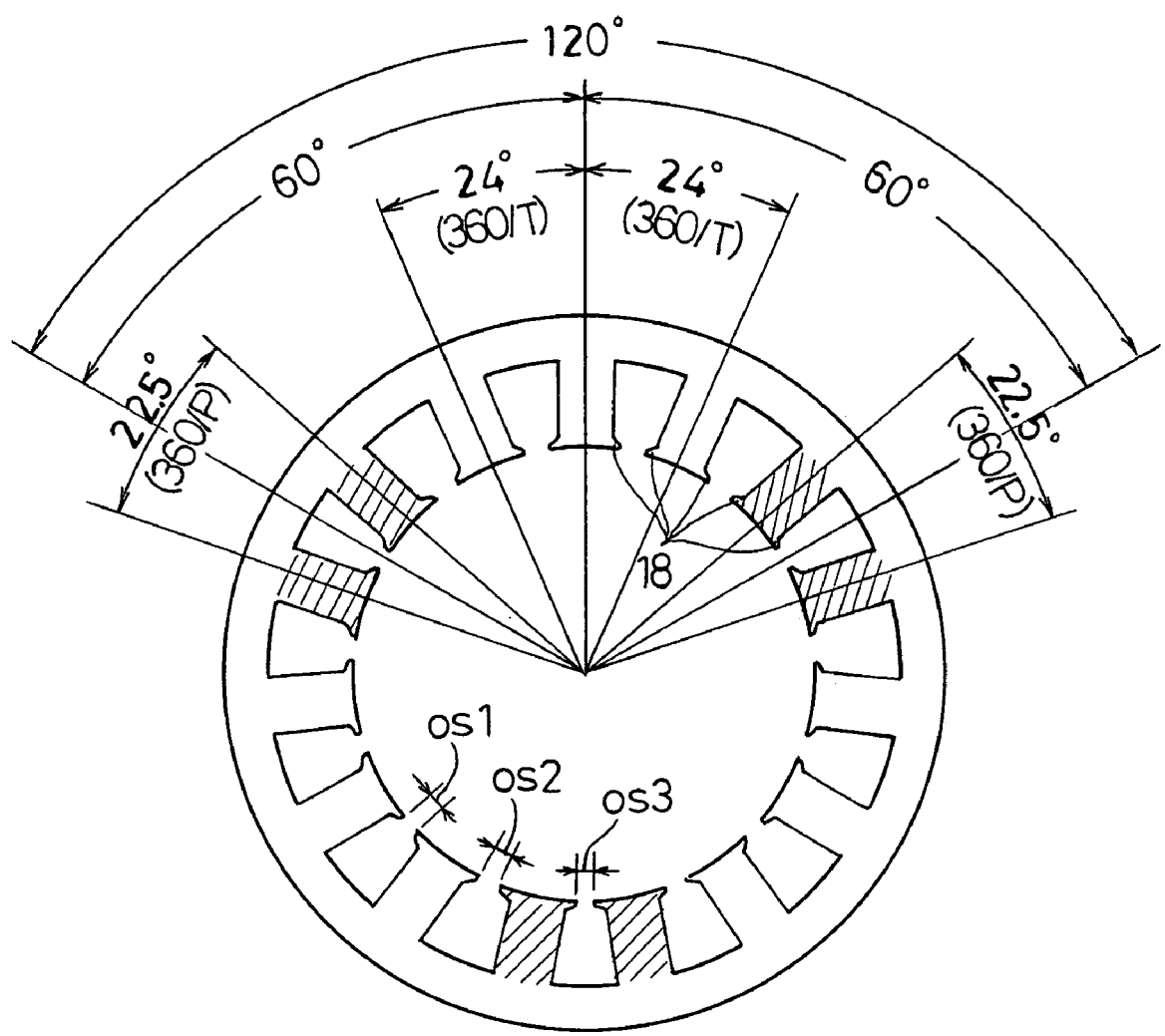
FIG. 8 is a sectional view of a stator core according to a third embodiment of the invention.
Figure 9:
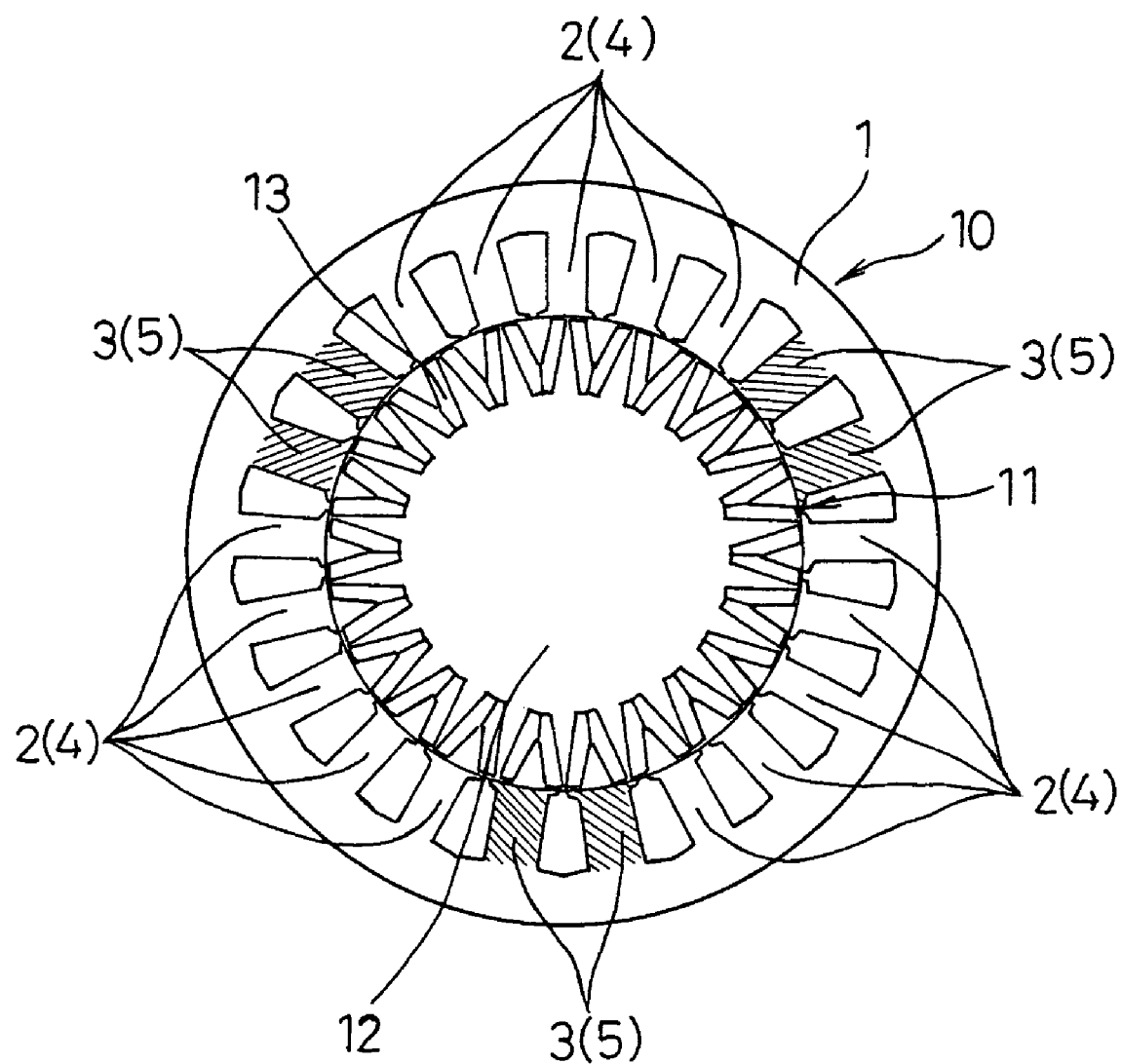
FIG. 9 is a sectional view schematically showing the configuration according to a fourth embodiment of the invention.

A third embodiment of the invention will be described with reference to FIG. 8. The motor generator in the previous embodiment has three pairs in total, that is, two pairs in the first stator teeth section 4, and one pair in the second stator teeth section 5. The motor generator in this embodiment includes five pairs in total, that is, three pairs in the first stator teeth section 4, and two pairs in the second stator teeth section 5, fifteen stator teeth in total, and sixteen poles (not shown) of the permanent magnets 13. In the case where the second stator teeth section 5 has more than one pair, the pitch of the stator teeth 2 of the first stator teeth section 4 is set to 24° (360/T), and the pitch of the stator teeth 3 of the second stator teeth section 5 is set to 22.5° (360/P). The length of the leg 18 that extends toward both sides in the circumferential direction is adjusted at the distal ends of each of the stator teeth 2 and 3 such that the open slot angle os1 between the stator teeth 2,2, the open slot angle os2 between the stator teeth 2 and 3, and the open slot angle os3 between the stator teeth 3, 3 become substantially equal to one another.

In the case where the first stator teeth section 4 is used as a motor or a generator, and the second stator teeth section 5 is mainly used as the generator, the first stator teeth section 4 constitutes the motor with improved cogging torque, and the stator teeth 3 of the second stator teeth section 5 has the phase completely coincided with that of the permanent magnet 13 so as to improve controllability in the generated voltage, resulting in improved power generation feature. Further, in this embodiment the open slots between the stator teeth are made uniform. Accordingly, the variation in the permeance of the magnet path of the permanent magnet 13 that passes through the open slot is reduced, thus reducing the cogging torque also in the second stator teeth section 5.

Fourth Embodiment

Figure 10:
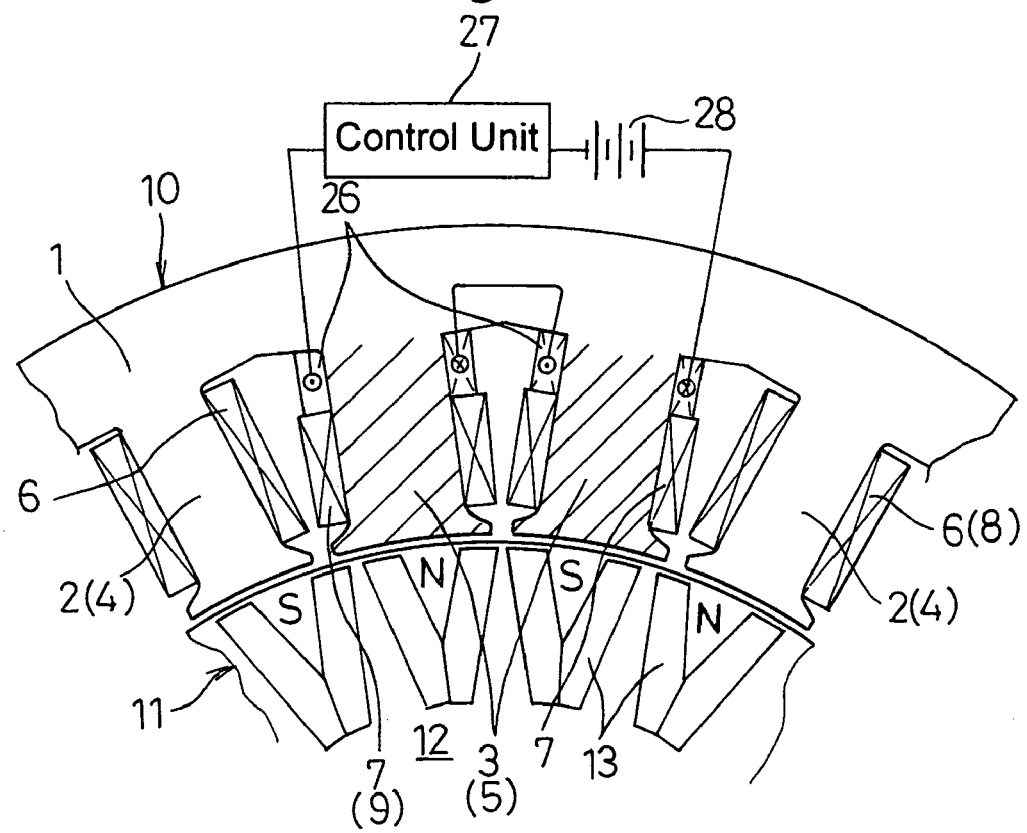
FIG. 10 is a sectional view showing an essential portion of the configuration according to a first modified example of the fourth embodiment of the invention.
Figure 11:
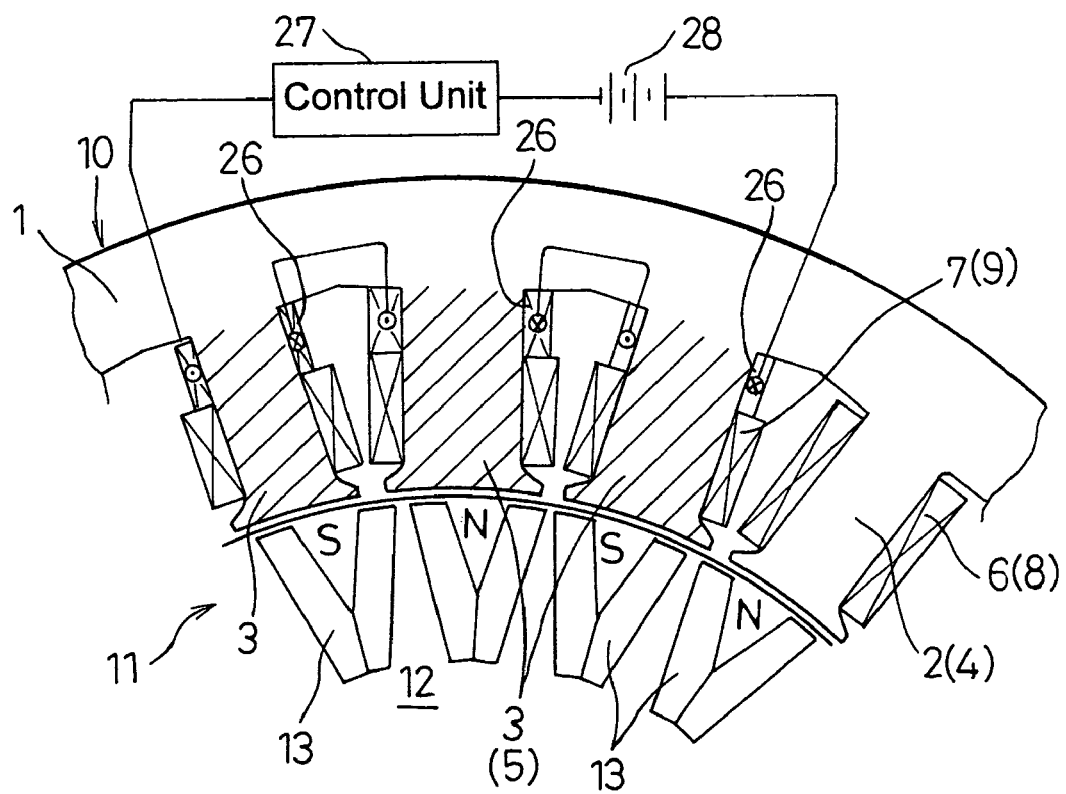
FIG. 11 is a sectional view showing an essential portion of the configuration according to a second modified example of the fourth embodiment of the invention.
Figure 12:
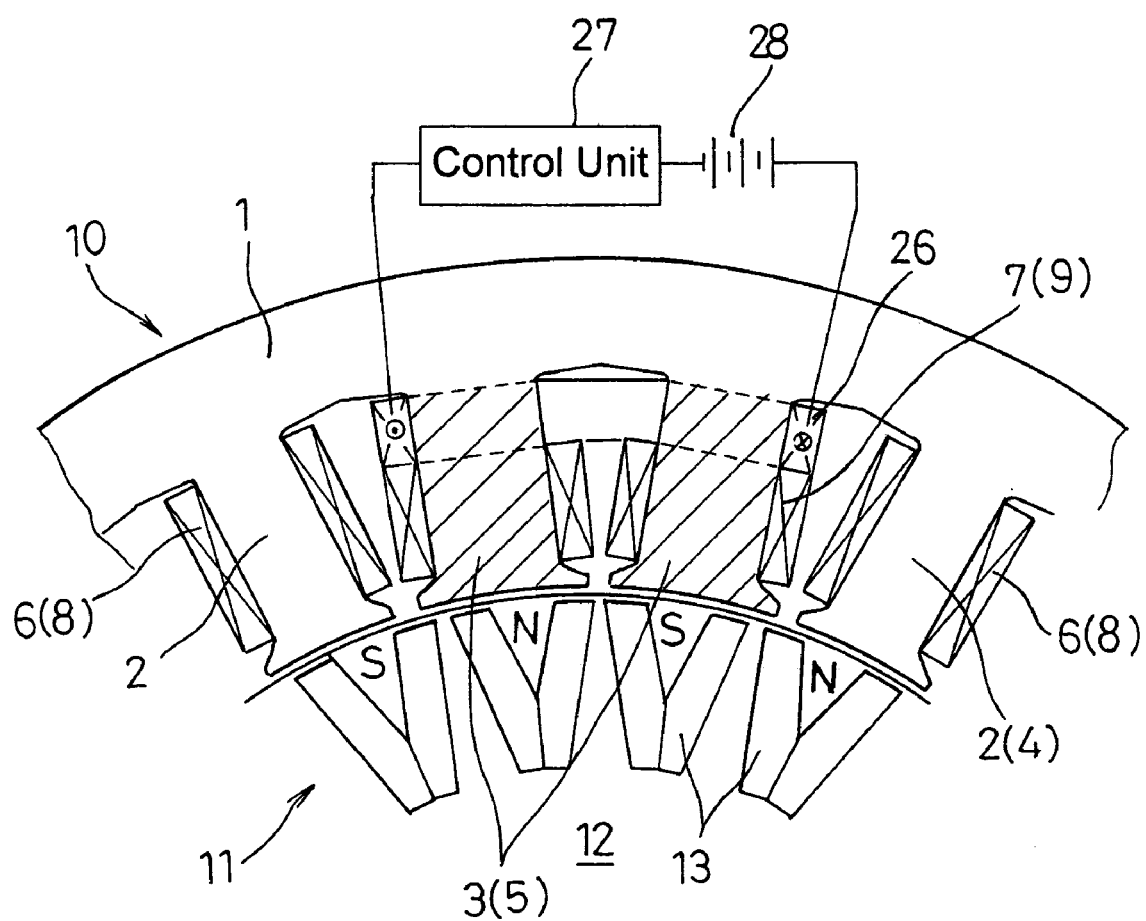
FIG. 12 is a sectional view showing an essential portion of the configuration according to a third modified example of the fourth embodiment of the invention.

A fourth embodiment will be described with reference to FIGS. 9 to 12. In the motor generator shown in FIG. 9, the first stator teeth section 4 has five pairs and the second stator teeth section 5 has two pairs, that is, seven pairs in total. The total number of stator teeth is 21, and the number of poles of the permanent magnet 13 is 22. In the case where the second stator teeth section 5 has a plurality of stator teeth 3, control windings 26 are wound around respective adjacent stator teeth 3 independent from the winding 7 and in the same direction. They are connected in series as shown in FIG. 10. A DC power source 28 is connected to the control winding 26 via a control unit 27 such that the DC current for the control is supplied. Referring to FIG. 11, in the case where the number of adjacent stator teeth 3 of the second stator teeth section 5 is odd, it is preferable that the sum of the winding number of the control winding(s) 26 wound around the stator teeth(s) 3 of the same polarity is substantially made equal to the sum of the winding number of the control winding(s) 26 wound around the stator teeth(s) 3 of the opposite polarity. Referring to FIG. 12, the control winding 26 may be wound over the adjacent stator teeth 3, 3 of the second stator teeth section 5. In FIGS. 10 to 12, the winding 7 is provided at the distal end of the stator teeth 3, and the control winding 26 is arranged at the opposite side. However, the relationship of the arrangement between the winding 7 and the control winding 26 may be reversed.

In this configuration described above in which the control windings 26 are wound in the same direction around the respective adjacent stator teeth 3 with different phases and are connected in series, the voltage induced by the control winding 26 is set to zero. As a result, the direct current is supplied to the control windings 26 from the DC power supply 28 via the control unit 27. The supply of the direct current makes it possible to change the magnetic resistance of the stator teeth 3, thus controlling the amount of flux that crosses the winding 7 around the stator teeth 3. As a result, the voltage generated by the winding 7 may be controlled, and the power at a predetermined voltage is output from the second winding section 9 that is wound around the second stator teeth section 5.

Fifth Embodiment

Figure 13:
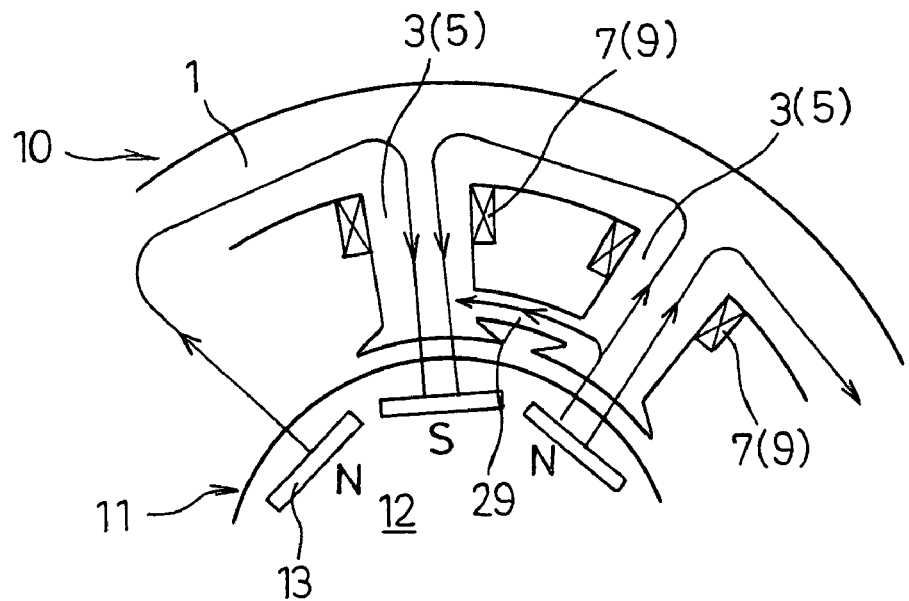
FIG. 13 is a sectional view showing an essential portion of the configuration according to a fifth embodiment of the invention.

A fifth embodiment of the invention will be described with reference to FIGS. 13 to 15. In this embodiment, a division path 29 is formed between adjacent stator teeth 3, 3 of the second stator teeth section 5 such that the flux from the permanent magnet 13, which passes through those stator teeth 3 is divided to bypass the wound portion of the winding 7 as shown in FIG. 13.

As the voltage induced by the winding 7 is proportional to the rotating number, the voltage becomes substantially high upon high-speed rotating operations. The division path 29 of the above-described configuration allows the induced voltage of the winding 7 to be restrained to the value equal to or lower than the maximum allowable voltage irrespective of the highest number of rotation.

Figure 14:
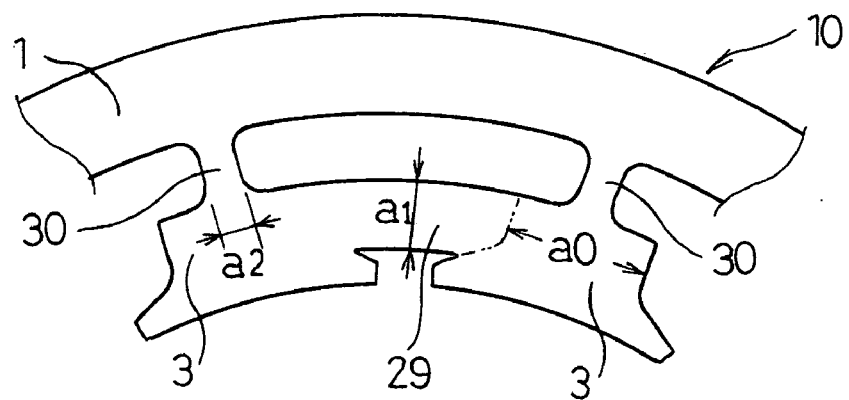
FIG. 14 is a sectional view of a stator core according to a modified example of the fifth embodiment of the invention.
Figure 15:
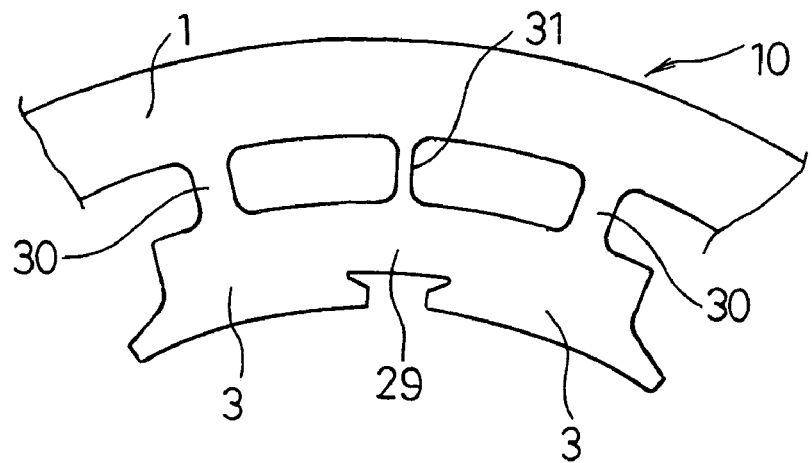
FIG. 15 is a sectional view of a stator core according to another modified example of the fifth embodiment of the invention.

Referring to FIG. 14, the division path 29 serves to connect portions each having the original width a0 of the stator teeth at the distal end side from the wound portion 30 of the stator teeth 3. The width a2 of the stator teeth of the wound portion 30 of the stator teeth 3 is made smaller than that (a1) of the division path 29. In the aforementioned configuration, since the wound portion 30 of the winding 7 of the stator teeth 3, has a smaller width a2, upon rotating operation at high speeds in the aforementioned state the flux is saturated to hold the generated voltage in a peak state, thus controlling the induced voltage to be held constant. If the width a2 of the wound portion 30 of the stator teeth 3 is reduced, the strength of the stator teeth 3 is also reduced. Then the division path 29 and a yoke of the stator core 1 between the stator teeth 3, 3 may be connected by forming at least one bridge 31, as shown in FIG. 15, so as to keep the required strength of the stator teeth 3.

Sixth Embodiment

A sixth embodiment of the invention will be described with reference to FIGS. 16 to 18B. In the previous embodiment, the division path 29 is provided such that the flux from the permanent magnet 13 is bypassed, and the maximum induced voltage is restrained. In this embodiment, a control winding 32 is wound at the division path 29 so as to control electric current supplied to the control winding 32 as shown in FIG. 16.

Figure 16:
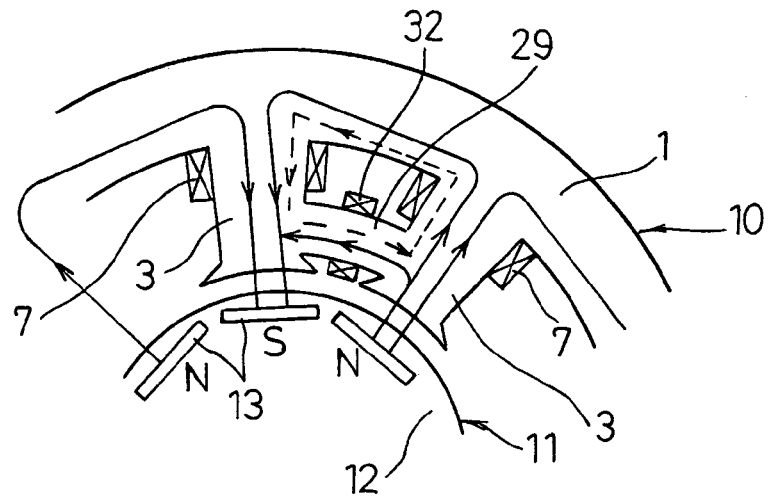
FIG. 16 is a sectional view showing an essential portion of the configuration according to a sixth embodiment of the invention.

In the aforementioned configuration, the electric current is supplied to the control winding 32 such that the control winding flux is generated as shown by broken line arrow in the direction opposite to the one in which the flux from the permanent magnet 13 passes through the division path 29 as shown by solid line arrow in FIG. 16. As a result, the amount of flux passing through the division path 29 is controlled. Accordingly, the amount of flux from the permanent magnet 13 passing through the wound portion of the stator teeth 3 is controlled so as to positively control the voltage induced by the winding 7. As a result, the output voltage is held at a predetermined value in spite of the change in the current from the second winding section 9.

Figure 17A:
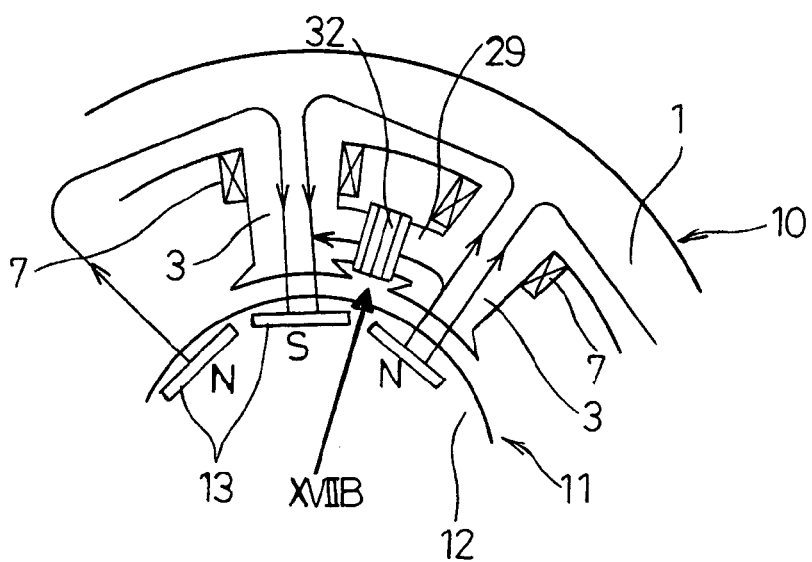
Figure 17B:
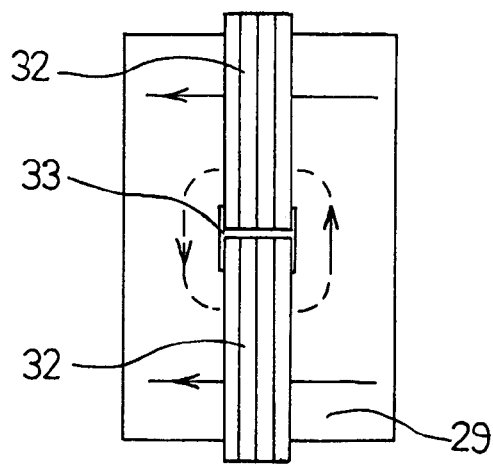
Figure 18A:
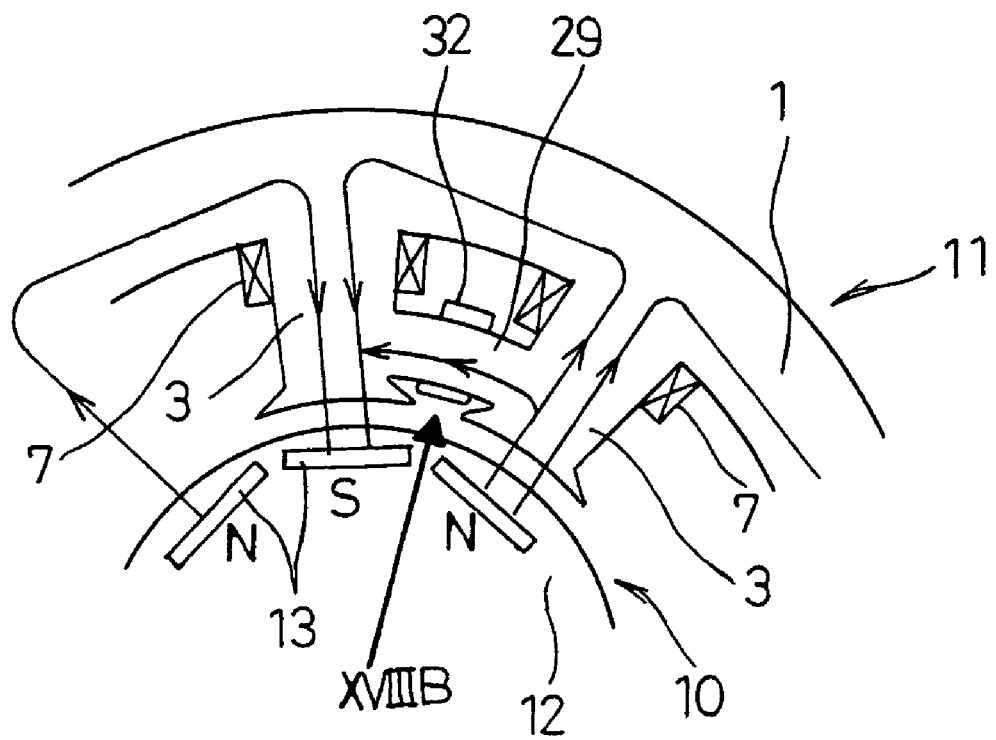
Figure 18B:
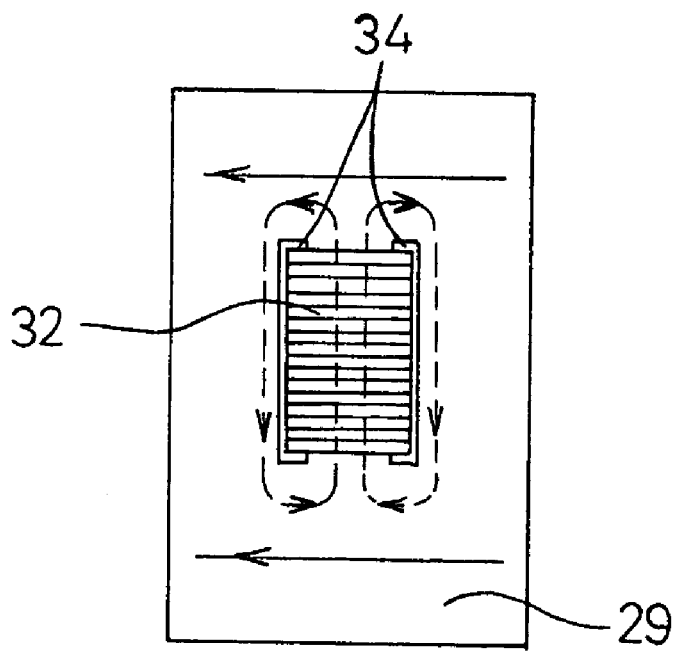

In the example shown in FIG. 16, the control winding 32 is wound around the division path 29 along the rotational axis direction such that the control winding flux passes through the division path 29, the stator teeth 3, the stator yoke, and the stator teeth 3. Alternatively, as shown in FIGS. 17A and 17B, a slit 33 for winding the control winding 32 is formed at the mid portion of the division path 29 in the rotational axis direction, and at least one control winding 32 is wound around a portion of the division path 29 in the rotational axis direction such that the control winding flux is passed circularly within the division path 29 as shown by a broken line arrow in FIG. 17B. Alternatively, as shown in FIGS. 18A and 18B, a plurality of slits 34 for winding the control winding 32 are formed at the mid portion of the division path 29 in the circumferential direction. Then at least one control winding 32 is wound around a circumferential portion of the division path 29 in the circumferential direction such that the control winding flux is passed circularly within the division path 29.

Seventh Embodiment

A seventh embodiment of the invention will be described with reference to FIGS. 19, and 20A to 20C. In the embodiment as shown in FIG. 19, an annular short-circuit ring 35 formed of, for example, copper, aluminum, iron or an alloy containing those metals is provided at the portion closer to the rotor 11 than the wound portion of the winding 7 of the stator teeth 3 so as to surround the stator teeth 3.

In the aforementioned configuration, if a voltage is induced in the short-circuit ring 35 by the flux from the permanent magnet 13 crossing thereto, and the DC resistance value is negligible, the flux with the same phase as that of the crossing flux in the opposite direction is generated. The generated crossing flux functions in erasing the flux from the permanent magnet 13. Accordingly, the flux that crosses the winding 7 is reduced to restrain the voltage generated by the winding 7 such that the terminal voltage of the second winding section 9 upon high speed rotating operation does not exceed a predetermined value. The stator teeth 3 is provided only with the short-circuit ring 35, keeping the number of components of the structure as minimum as possible while improving reliability.

Figure 19:
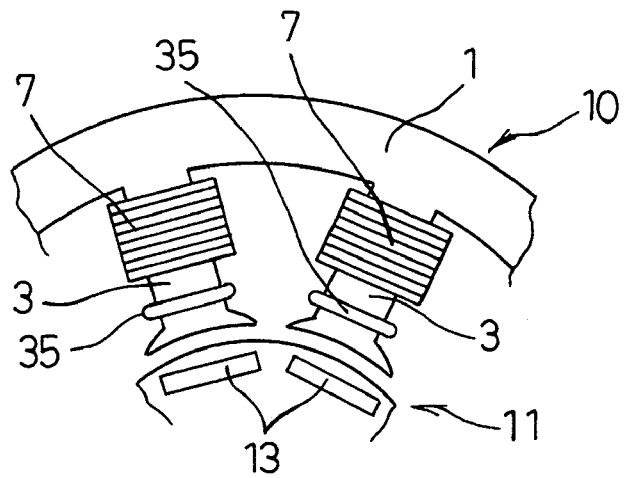
FIG. 19 is a sectional view showing an essential portion of the configuration according to a seventh embodiment of the invention.

In the example shown in FIG. 19, the short-circuit ring 35 is provided on the outer periphery of the stator teeth 3 at a position closer to the rotor 11 than the winding 7. As shown in FIG. 20A, a recess portion 36 is formed in the center of the inner periphery of the stator teeth 3 that faces the rotor 11. The short-circuit ring 35 may be provided so as to surround the portion between the recess portion 36 and one of side surfaces of the stator teeth 3 in the rotating direction of the rotor. In the aforementioned configuration, the flux from the permanent magnet 13 partially crosses the short-circuit ring 35, and the flux generated in the short-circuit ring 35 is partially dispersed into the closed magnetic circuit formed around the short-circuit ring 35 as shown by arrow 37. Accordingly the effect for erasing the flux from the permanent magnet 13 by the short-circuit ring 35 may be restrained. Thus, a portion of the stator teeth 3 is provided with the short-circuit ring 35 so as to adjust the flux erasing effect.

Figure 20B:
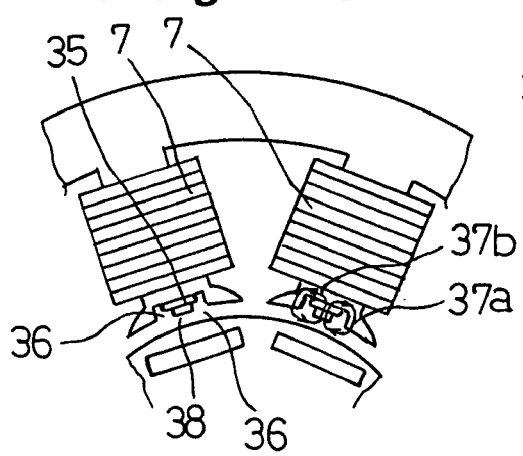
FIGS. 20A to 20C are sectional views each showing an essential portion of the configuration according to respective modified examples of the seventh embodiment of the invention.
Figure 20A:
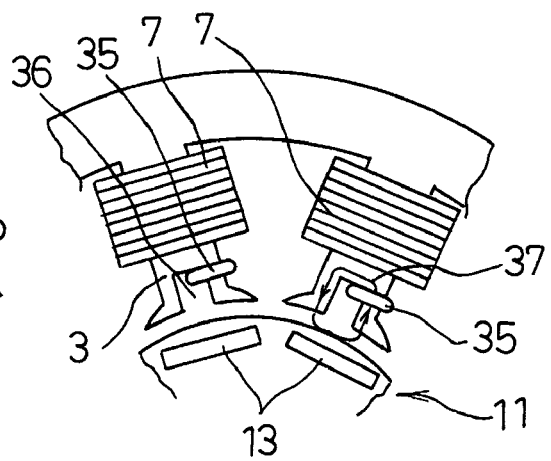
Figure 20C:
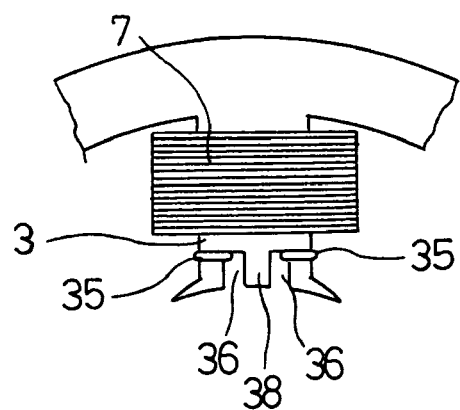

Alternatively, as shown in FIG. 20B, two recess portions 36 are formed on the inner periphery of the stator teeth 3, and the short-circuit ring 35 is provided to surround a protrusion 38 between those recess portions 36, 36. In this way, the flux formed by the short-circuit ring 35 is partially dispersed into the closed magnetic circuit formed around the short-circuit ring 35 as shown by arrows 37a, 37b. As a portion of the stator teeth 3 is provided with the short-circuit ring 35, the flux erasing effect may be adjusted. Alternatively, as shown in FIG. 20C, two short-circuit rings 35 may be provided to each surround a portion between one recess portion 36 and each surface of the stator teeth 3 in the rotating direction of the rotor such that the same effect as described above is obtained.

Eighth Embodiment

Figure 21:
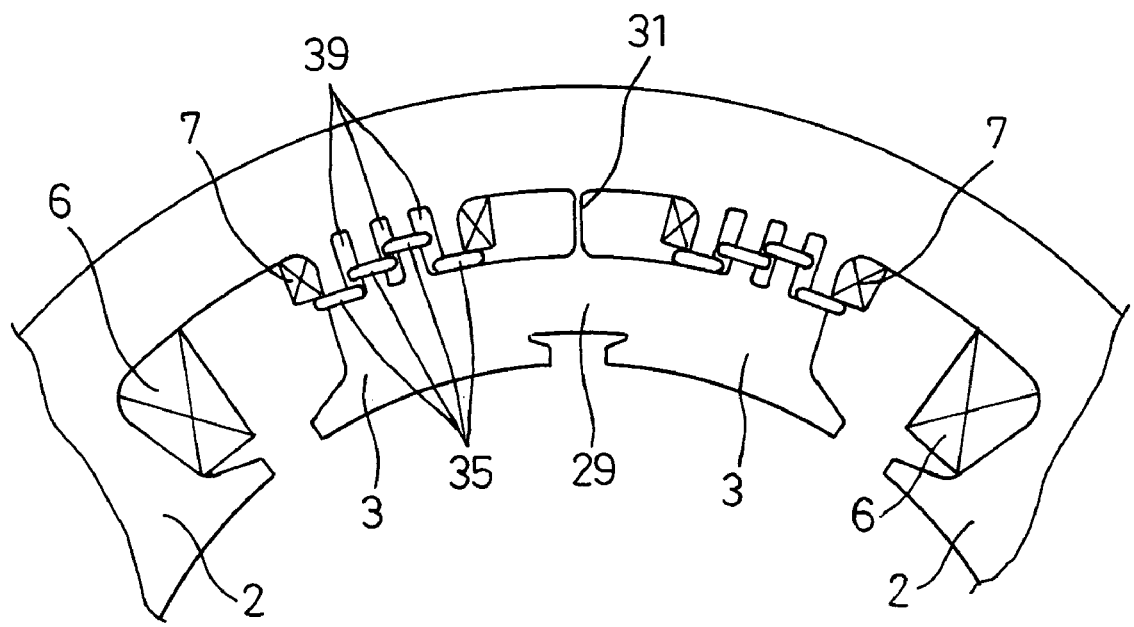
FIG. 21 is a sectional view showing an essential portion of the configuration according to an eighth embodiment of the invention.

An eighth embodiment of the invention will be described with reference to FIG. 21. The embodiment is constituted by combining the fifth embodiment described with reference to FIGS. 13 to 15 (especially FIG. 15) and the seventh embodiment described with reference to FIGS. 19 and 20A to 20C. In this embodiment, the stator teeth 3, 3 are connected by the division path 29, and the short-circuit ring 35 is attached to the stator teeth 3. The width of the stator teeth 3 in the rotor operating direction is increased. At least one slit 39 is formed at an appropriate interval in the rotor operating direction so as to reduce the sectional area of the stator teeth 3 yet maintaining its strength. Furthermore, at least one short-circuit ring 35 is provided to surround the portion between the slit 39 and the side surface of the stator teeth 3 in the rotor operating direction or the portion between those slits 39, 39.

The aforementioned configuration provides the same effect as derived from providing the division path 29 and the short-circuit ring 35 as well as maintains the strength of the stator teeth 3 while reducing the amount of the flux that crosses the short-circuit ring 35. Accordingly, the combustion loss is unlikely to occur in spite of the use of the short-circuit ring 35 with small current capacity, allowing the crossing flux passing through the winding portion of the winding 7 of the stator teeth 3 to be substantially constant in the compact structure, and the output voltage to be substantially constant by effectively reducing the generated voltage upon high-speed rotating operation. A modified example of this embodiment may be constituted without providing the division path 29. In this case, a slit 39 is formed in the stator teeth 3 to which the corresponding short-circuit ring 35 is provided, resulting in the same effects as described above.

Ninth Embodiment

Figure 22:
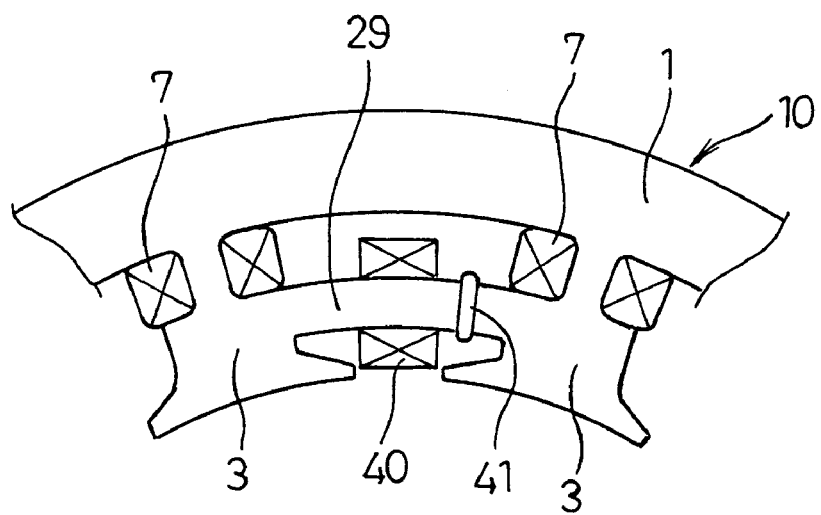
FIG. 22 is a sectional view showing an essential portion of the configuration according to a ninth embodiment of the invention.

A ninth embodiment of the invention will be described with reference to FIG. 22. The embodiment is constituted in accordance with the fifth embodiment described with reference to FIGS. 13 to 15 (especially FIG. 15), in which electric power is obtained by winding a power generating winding 40 around the division path 29. In this embodiment, a short-circuit ring 41 is further provided to surround the division path 29 such that the terminal voltage of the power generating winding 40 does not exceed a predetermined range upon high-speed rotating operation. In this embodiment, the division path 29 is provided with the power generating winding 40 so as to efficiently obtain electric power.

Tenth Embodiment

Figure 23:
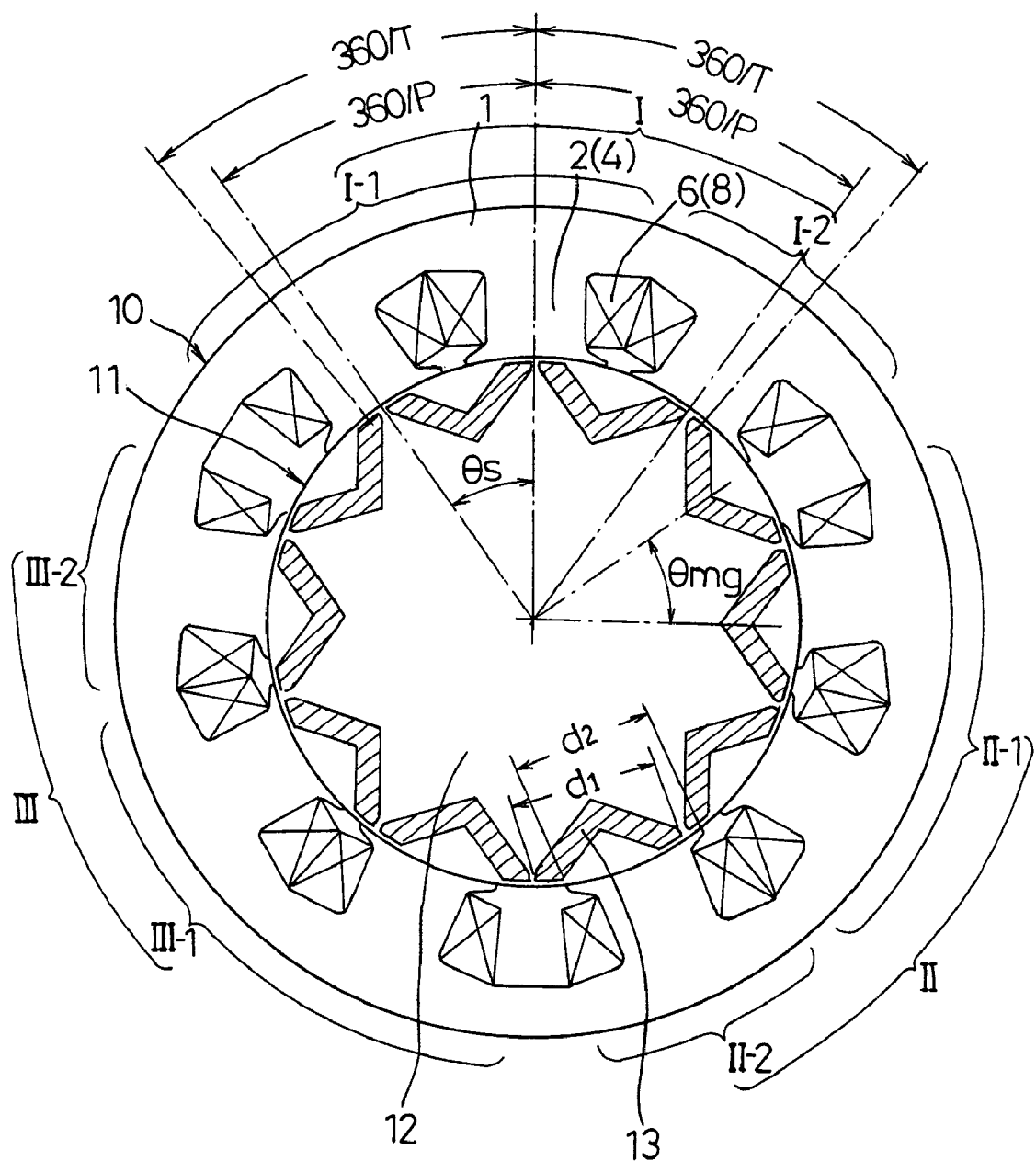
FIG. 23 is a sectional view schematically showing the configuration according to a tenth embodiment of the invention.
Figure 24:
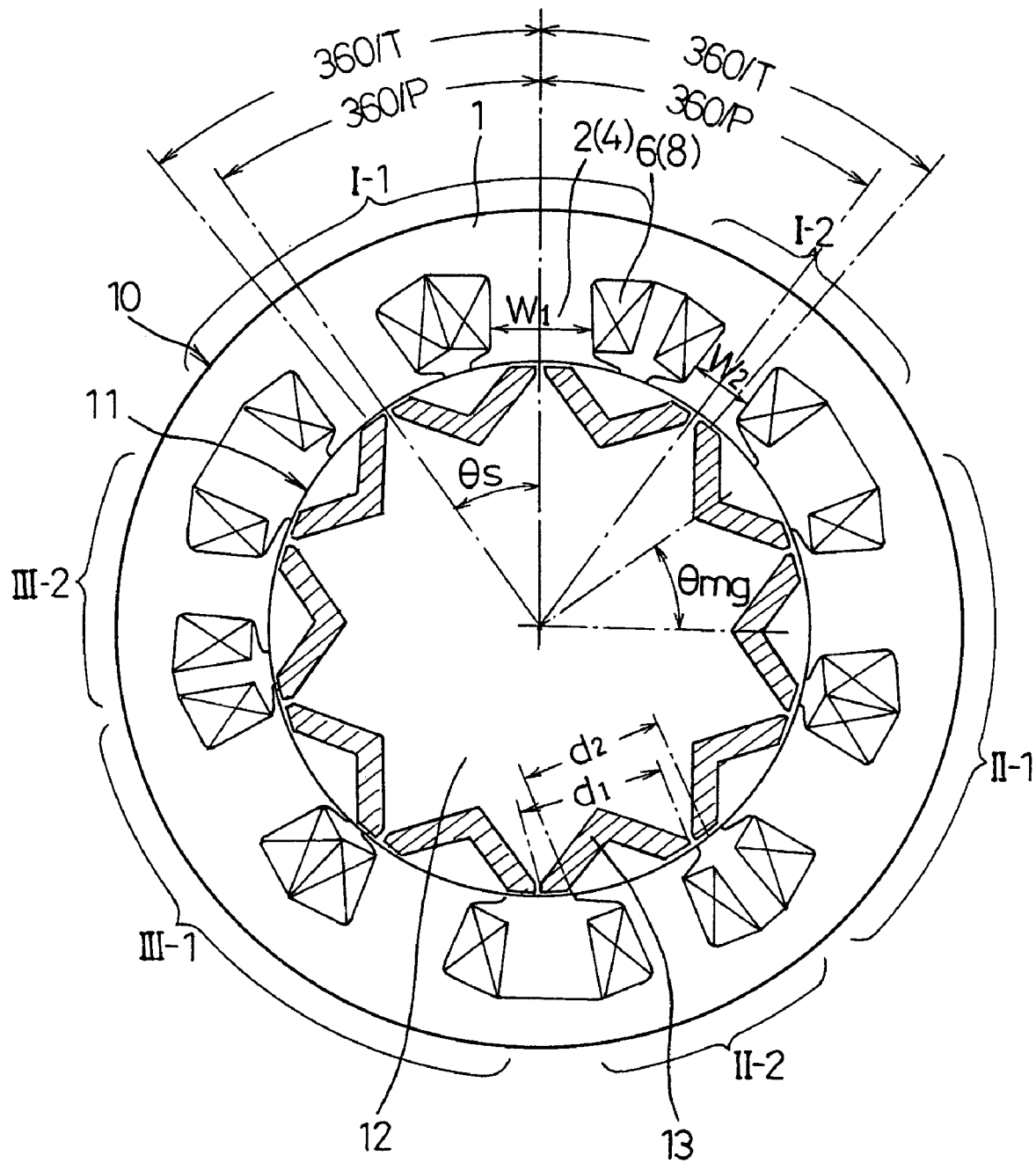
FIG. 24 is a sectional view schematically showing a modified example according to the tenth embodiment of the invention.

A tenth embodiment of the invention will be described with reference to FIGS. 23 and 24. According to the previous embodiment, the motor generator includes the first stator teeth section 4 having a plurality of stator teeth groups I, II, III formed of a plurality of stator teeth 2 each at the same phase, and the second stator teeth section 5 having at least one stator teeth 3 arranged between the stator teeth groups. In the aforementioned motor generator, the total number T of the stator teeth 2 and 3 is smaller than the number P of the permanent magnets 13 such that the electric power is independently input to or output from the first and second stator teeth sections 4 and 5. In the motor generator according to this embodiment, the stator 10 is provided only with the first stator teeth section 4 as shown in FIG. 23. The stator teeth 2 of the first stator teeth section 4 are divided into a plurality of stator teeth groups I, II, and III, each formed of a plurality of stator teeth 2 around which windings 6 to which the voltages with U phase, V phase, and W phase are respectively applied are wound and which are adjacent to each other. Winding directions of those adjacent stator teeth 2 are opposite to each other. In the respective stator teeth groups I, II, and III, the stator teeth 2 are divided into a plurality of secondary stator teeth groups I-1, I-2, II-1, II-2, III-1, and III-2, respectively such that electric power is independently input to or output from each of the windings 6 in the secondary stator teeth groups I-1, II-1, III-1, and I-2, II-2, III-2.

The electric power is independently input to or output from each of the windings 6 of the respective secondary stator teeth groups I-1, II-1, III-1 and I-2, II-2, III-2, in the aforementioned configuration such that a plurality of electric powers may be input or output. The distribution of the input or output of the electric power may be freely designed by arbitrarily setting the secondary stator teeth groups. Like the above-described embodiments, the number P of the poles of the permanent magnets 13 is set to the value larger than the total number T of the stator teeth 2, and to be as minimum as possible that can be established by the equation (2), thus improving the volume efficiency.

In the example shown in FIG. 23, each width of the stator teeth 2 in the rotor operating direction is set to the same value between the secondary stator teeth groups I-1, II-1, III-1, and I-2, II-2, III-2. Alternatively, as shown in FIG. 24, assuming that the width of the stator teeth of the first secondary stator teeth groups I-1, II-1, III-1 is designated as w1, and the width of the stator teeth of the second secondary stator teeth groups I-2, II-2, III-2 is designated as w2 , and the relationship w1>w2 is established, saturated amounts of the crossing flux passing through the respective stator teeth 2 become different from each other. Accordingly, the distribution of the electric power to be obtained may be changed.

The tenth embodiment may be applied to the first stator teeth section 4 of the first embodiment so as to be used together with the second stator teeth section 5. This makes it possible to provide the motor generator that provides at least three types of electric power from the first and second secondary stator teeth groups of the first stator teeth section 4, and the second stator teeth section 3, respectively.

Eleventh Embodiment

Figure 25A:
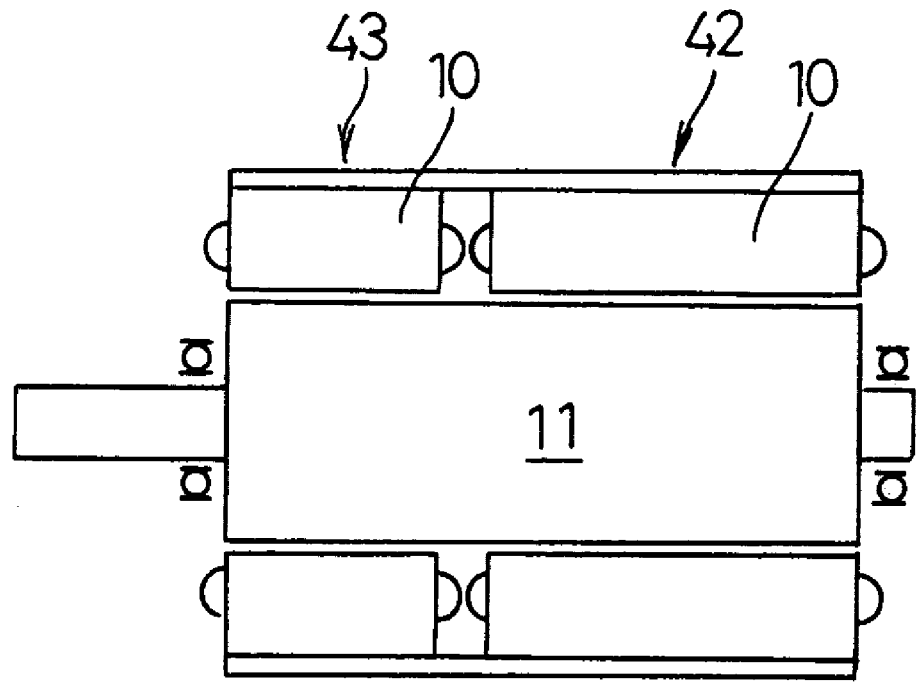

An eleventh embodiment of the invention will be described with reference to FIGS. 25A and 25B. The embodiment includes a stator 10 having a plurality of stator teeth 2 each wound with a winding 6, and a rotor 11 having permanent magnets 13 by the number larger than that of the stator teeth 2, which are arranged along the circumferential direction at equal intervals as shown in FIG. 23. The aforementioned stator teeth 2 are divided into a plurality of stator teeth groups I, II, and III each comprising the plurality of adjacent stator teeth 2 around which windings 6 to which the voltages with U phase, V phase, and W phase are applied, respectively, and in which winding directions of the windings 6 provided for the adjacent stator teeth 2 are opposite to each other. In this embodiment, however, unlike the one shown in FIG. 23, a plurality of units 42 and 43 having the stator teeth 2 undivided into the secondary stator teeth groups are stacked in the rotational axis direction. Referring to FIG. 25A, the rotor 11 for the plurality of units 42 and 43 is formed as a single body so as to be commonly used.

The aforementioned configuration makes it possible to independently input or output the electric power with respect to those units 42 and 43. Each thickness or diameter of the units 42 and 43 may be arbitrarily changed so as to arbitrarily set the power distribution. As in the previous embodiments described above, the number P of the permanent magnets 13 is set to the value larger than the total number T of the stator teeth 2, and to be as minimum as possible which can be established by the equation (2), thus improving the volumetric efficiency.

Figure 25B:
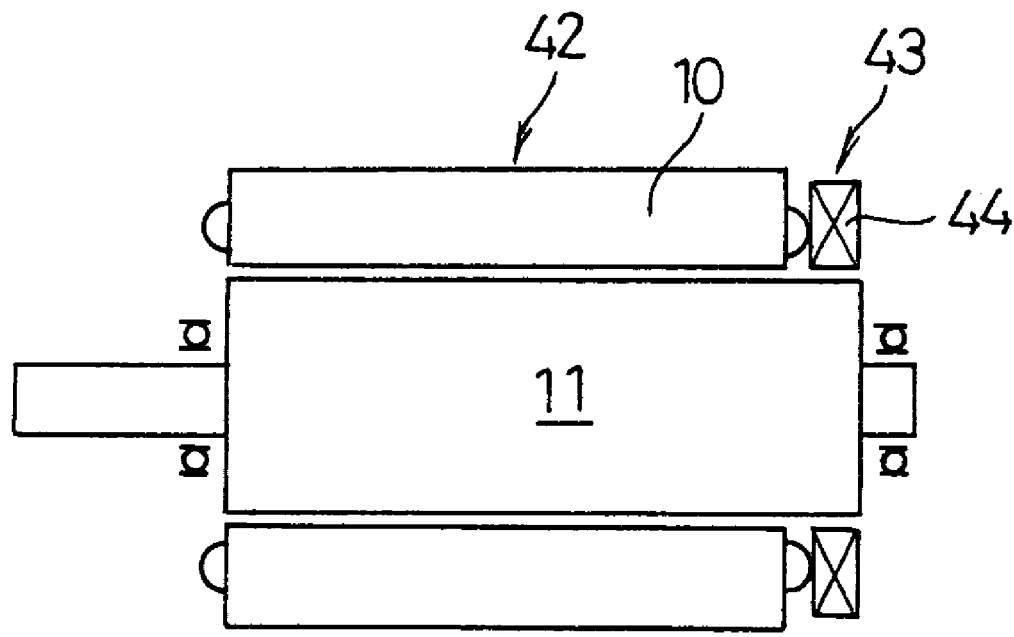

In this embodiment, a stator 44 formed of a winding with no stator core may be employed as the unit 43 that generates less power compared with the unit 42 as shown in FIG. 25B. This reduces the axial length of the motor generator.

In a modified example of this embodiment, a unit formed of the first stator teeth section 4 and the second stator teeth section 5 as shown in FIG. 1, or a unit in which the stator teeth group shown in FIG. 23 is further divided into the secondary stator teeth groups may be stacked in the rotational axial direction. This makes it possible to obtain more power.

Figure 26:
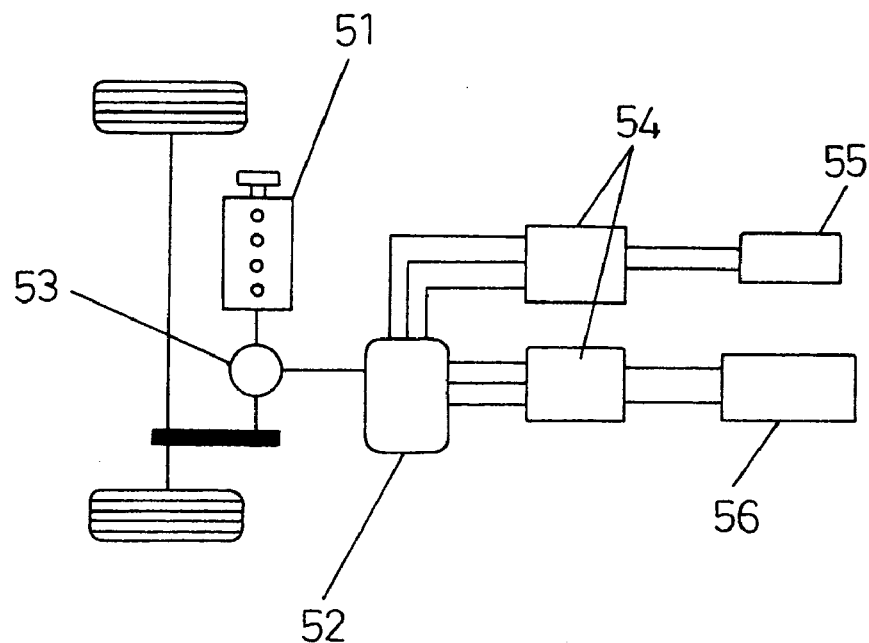
FIG. 26 is a schematic view showing an electric vehicle employed with a motor generator of the present invention.

FIG. 26 is a schematic view illustrating an electric vehicle comprising the motor generator of the present invention. In FIG. 26, the drive train 53 transmits power from the engine 51 or the motor generator 52, or power from both of the engine 51 and the motor generator 52 to tires. The motor generator 52 comprises two kinds of windings which are electrically independent each other. One of the winding is connected to a high voltage battery 56 (for example, 240V battery) via a power converter 54, and the other is connected to a low voltage battery 55 (for example, 12V battery) via another power converter 54.

In the system comprises a configuration shown in the FIG. 26, the motor generator 52 is connected to two types of power sources. Since these two types of power sources are electrically independent, and the windings provided internally are also electrically independent to each other as described through the aforementioned configuration of the motor generator of the present invention, the isolation between the plurality types of windings are kept easily.

Also, in the configuration where one of the plurality of windings of the motor generator 52 connected to the high voltage battery 56 is configured for driving the vehicle and other of the plurality of windings connected to the low voltage battery 55 is configured as a generator for charging the low voltage battery 55, it is possible to charge the low voltage battery 55 while the vehicle is being driven by the power generated from the motor generator 52. Accordingly, the low voltage battery 55 is charged without preparing another devices such as an alternator or a DC-DC converter, so that the low cost and space savings are achieved by above-mentioned configuration.

Figure 27:
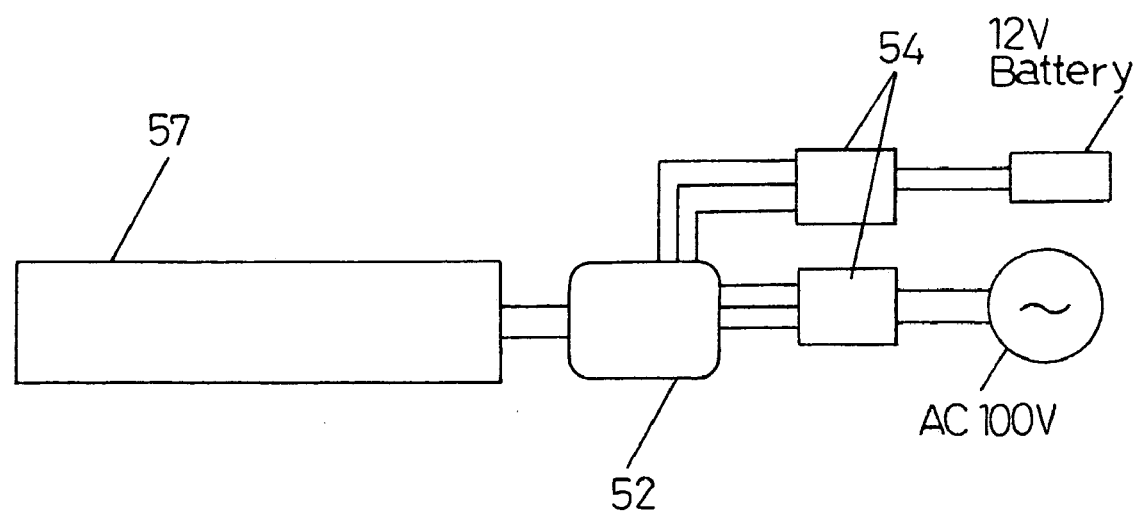
FIG. 27 is a schematic view showing a generator using aerogenerator, internal combustion engine, or external combustion engine employed with a motor generator of the present invention.
Figure 28:
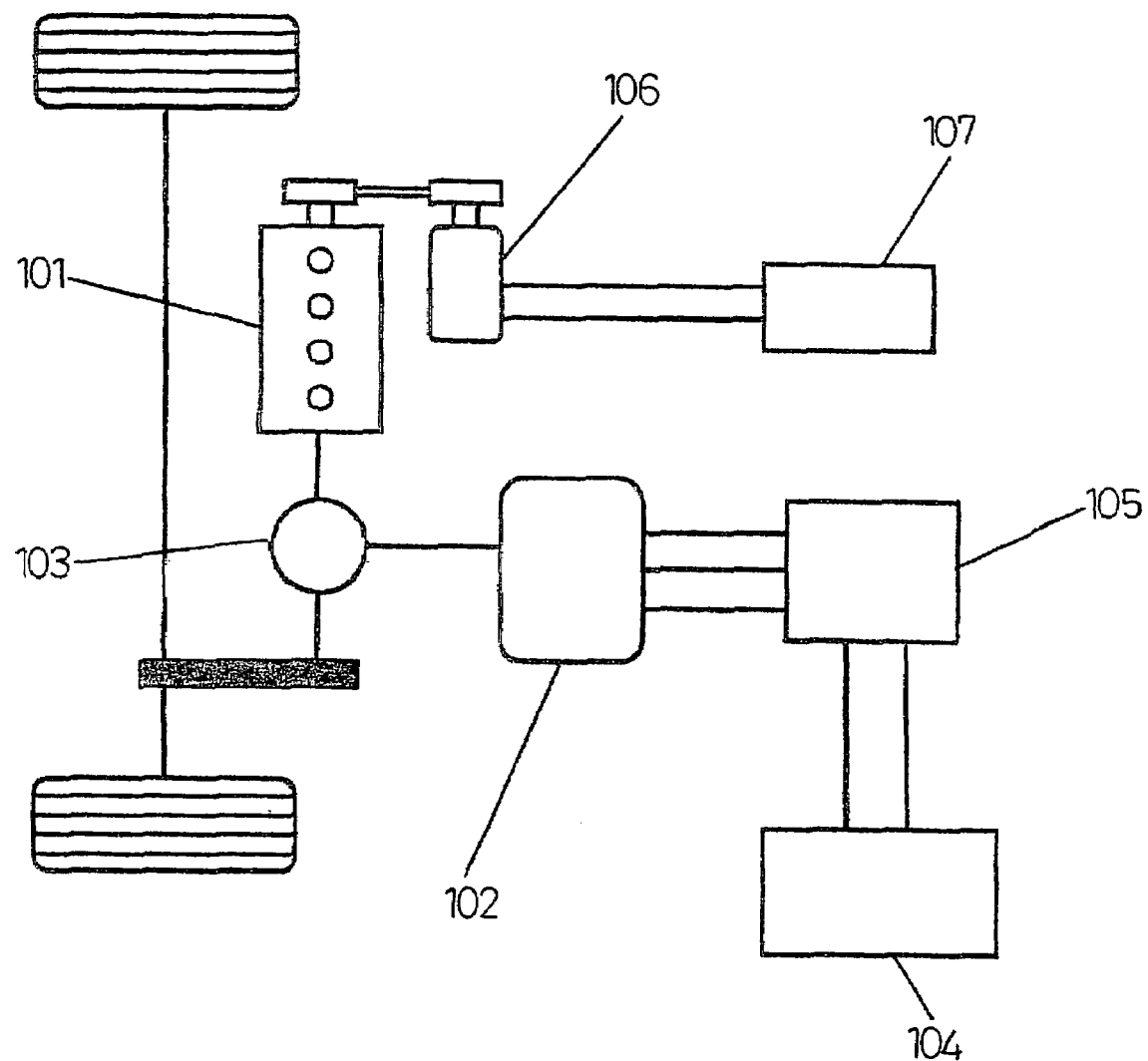
FIG. 28 is a schematic view showing a hybrid electric vehicle employed with a conventional motor generator.

In a generator using aerogenerator, internal combustion engine or external combustion engine, as shown in FIG. 27, the motor generator 52 is activated by external energy such as wind forces and the motor generator 52 generates a plurality of electrically independent powers. Accordingly, the motor generator 52 is applicable as a power source, for example, 12-volts battery and AC 100V power source.

In the aforementioned embodiment, the motor generator of inner rotor type in which the rotor 11 is rotationally placed on the inner side of the stator 10 is described. However, it is clear that the invention may be applied to the motor generator of outer rotor type in which the rotor is rotationally placed on the outer periphery of the stator such that the similar effects are obtained.

The motor generator described in the above embodiments may be employed as the motor for driving various types of the electric vehicle such as a pure electric vehicle (PEV), a hybrid electric vehicle (HEV), and a fuel cell electric vehicle (FCEV). Accordingly it does not have to prepare two types of motor generators, one for the high voltage system, and the other for the low voltage system as has been generally employed, nor DC-DC converter, thus constituting an electric vehicle drive system requiring less space while keeping the cost low. The motor generator according to the invention may be applied to an aerogenerator, and a generator for an internal or external combustion engine and a plurality of electric powers may be independently input or output. As a result, the power distribution may be arbitrarily designed, thus providing the similar effects.

The motor generator according to the invention is of field magnetic type using permanent magnets, and the stator teeth by the number smaller than that of the permanent magnets are wound with windings concentratedly, and is compact with reduced cost. The motor generator is formed of the first and second stator teeth sections of the stator teeth such that the electric power is independently input or output with respect to each of the windings of the first and second stator teeth sections. Moreover, the number of stator teeth of the first and second stator teeth sections is arbitrarily selected such that the power distribution of input or output is freely designed. As a result, the motor generator of the invention is suitable for various types of electric vehicle, aerogenerator, motor generator for an internal combustion engine or an external combustion engine and the like.

Although the present invention has been fully described in connection with the preferred embodiments thereof, it is to be noted that various changes and modifications apparent to those skilled in the art are to be understood as included within the scope of the present invention as defined by the appended claims unless they depart therefrom.

What is claimed is:

1. A motor generator comprising:
a stator in which a winding is wound around each of a plurality of stator teeth provided on a stator core;

a rotor having a plurality of permanent magnets larger in number than the number of stator teeth, the plurality of permanent magnets being arranged circumferentially on a rotor core at equal intervals;

wherein the stator teeth are formed of a first stator teeth section having a plurality of groups of adjacent stator teeth around which a winding to which the same phase voltage is applied is wound and in which winding directions of the windings around the adjacent stator teeth are opposite to each other, and a second stator teeth section formed of one or more stator teeth each having a different phase, the one or more stator teeth of the second section of teeth being positioned between and adjacent to each of a corresponding plurality of groups of adjacent teeth of the first section of teeth;

wherein when the second stator teeth section has a plurality of stator teeth, winding directions of the adjacent stator teeth are opposite to each other;

wherein electric power is independently input and output with respect to each of the windings of the first and second stator teeth sections; and wherein each respective winding of each stator teeth section receives the same respective phase voltage.

2. The motor generator according to claim 1, wherein the width of a distal end of the stator teeth in a circumferential direction is substantially equal to or larger than the effective width of the permanent magnet in the circumferential direction.

3. The motor generator according to claim 1, wherein the total number T of the stator teeth satisfies the following equation $$T = 3 \times s \times n, \text{ and}$$

the number of poles P of the rotor satisfies the following equation, and is set to a minimum value P larger than the total number T $$P = 2 \times (s(\pm 1 + 3k))$$

where t1 is the number of the stator teeth of the first stator teeth section, t2 is the number of the stator teeth of the second stator teeth section, T is the total number of the stator teeth, or (t1+t2), n is the total number of the stator teeth of one group of the first stator teeth section and the stator teeth of the second stator teeth section adjacent thereto, s is the number of winding groups one set of which is constituted by three stator teeth groups wound with windings at three U, V, and W phases, respectively, and k is a positive integer.

4. The motor generator according to claim 1, wherein an arrangement angle θs of the stator teeth satisfies 360/P<θs≦360/T where t1 is the number of the stator teeth of the first stator teeth section, t2 is the number of the stator teeth of the second stator teeth section, T is the total number of the stator teeth, or (t1+t2), and P is the number of pole.

5. The motor generator according to claim 1, wherein a pitch between the stator teeth of the first stator teeth section is set to 360/T where T is the total number of the stator teeth, and a pitch between the stator teeth of the second stator teeth section is set to 360/P where P is the number of poles of the rotor.

6. The motor generator according to claim 5, wherein a pitch between distal ends of the stator teeth of the second stator teeth section is set to 360/T, and an open slot is made uniform.

7. The motor generator according to claim 1, wherein when a pitch between the stator teeth of the first stator teeth section is not set to 360/P, the sectional area of a winding portion of the stator teeth is varied such that the difference in the flux density owing to the difference in phase between the adjacent stator teeth of the same phase is eliminated to provide a uniform the flux density.

8. The motor generator according to claim 1, wherein when a pitch between the stator teeth of the first stator teeth section is not set to 360/P, a skew at an arbitrary angle up to 360/P is provided to the adjacent stator teeth of the same phase.

9. The motor generator according to claim 1, wherein the rotor is formed by stacking a magnet type rotor portion in which a permanent magnet is disposed in a rotor core and a reluctance type rotor portion in which a rotor core is provided with a magnetic stator teeth, in an axial direction.

10. The motor generator according to claim 1, wherein a generated voltage is controlled by winding control windings around adjacent stator teeth of the same phase, in the same direction, connecting them in series, and supplying them with a direct current.

11. The motor generator according to claim 10, wherein when the number of adjacent stator teeth for power generation is odd, the sum of the winding number of the control winding(s) wound around the stator teeth(s) of the same polarity is substantially made equal to the sum of the winding number of the control winding(s) wound around the stator teeth(s) of the opposite polarity.

12. The motor generator according to claim 1, wherein a division path is formed between adjacent stator teeth of the same phase to divide flux.

13. The motor generator according to claim 12, wherein a2<a1 is satisfied where a1 is the width of the division path, and a2 is the width of a winding for power generation.

14. The motor generator according to claim 13, wherein a bridge is formed between a stator yoke and the division path connecting the stator teeth of the stator to connect them.

15. The motor generator according to claim 12, wherein a control winding is wound around the division path and is supplied with a current to control a generated voltage.

16. The motor generator according to claim 1, wherein at one or a plurality part of the stator teeth is provided with a short-circuit ring.

17. The motor generator according to claim 16, wherein the stator teeth is divided by at one or more slit to provide a plurality of magnetic paths, and a short-circuit ring is provided to at one or more part of the magnetic paths.

18. The motor generator according to claim 1, wherein a division path is formed between adjacent stator teeth of the same phase to divide flux, and a power generating winding is wound around the division path to output generated power.

19. The motor generator according to claim 18, wherein a short-circuit ring is provided to the division path.

20. The motor generator according to claim 1, wherein a control winding is wound over the adjacent stator teeth of the same phase and supplied with a direct current to control a generated voltage.

21. The motor generator according to claim 1, wherein a plurality of power output lines are provided in opposite directions along an axis thereof.

22. An electric vehicle comprising the motor generator according to claim 1.

23. An aerogenerator comprising the motor generator according to claim 1.

24. A generator for an internal combustion engine or an external combustion engine comprising the motor generator according to claim 1.

* * * * *